US008729733B2

(12) United States Patent
Takeuchi et al.

(10) Patent No.: US 8,729,733 B2
(45) Date of Patent: May 20, 2014

(54) POWER CONTROL APPARATUS, IMAGE FORMING APPARATUS, AND POWER CONTROL PROGRAM PRODUCT

(75) Inventors: Tomokazu Takeuchi, Tokyo (JP); Yuusuke Kohri, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 544 days.

(21) Appl. No.: 13/009,129

(22) Filed: Jan. 19, 2011

(65) Prior Publication Data

US 2011/0181116 A1 Jul. 28, 2011

(30) Foreign Application Priority Data

Jan. 28, 2010 (JP) ................................ 2010-017442
Oct. 6, 2010 (JP) ................................ 2010-226768

(51) Int. Cl.
*H02J 1/00* (2006.01)
*H02J 3/00* (2006.01)
*G03G 15/20* (2006.01)
*G05F 5/00* (2006.01)

(52) U.S. Cl.
USPC ................................ 307/75; 399/33; 323/299

(58) Field of Classification Search
None
See application file for complete search history.

(56) References Cited

U.S. PATENT DOCUMENTS

2009/0304401 A1* 12/2009 Hata ................................ 399/33

FOREIGN PATENT DOCUMENTS

JP 2004-233745 8/2004

* cited by examiner

*Primary Examiner* — Jared Fureman
*Assistant Examiner* — Aqeel Bukhari
(74) *Attorney, Agent, or Firm* — Oblon, Spivak, McClelland, Maier & Neustadt, L.L.P.

(57) ABSTRACT

A reception unit sequentially receives input of voltage values indicating an AC input voltage from an AC power supply. A ROM stores a power control table in which a power control parameter corresponding to the AC power supply voltage is matched with each group of the voltage values indicating the same AC power supply voltage. A decision unit determines to which group the received voltage values belong among the plurality of groups, whenever the reception unit receives the input of the voltage value and decides the group, to which a predetermined number of voltage values belongs among the plurality of voltage values sequentially received by the reception unit, among the plurality of groups using the determination result. A power control unit controls power supply according to the power control parameter matched with the decided group.

18 Claims, 21 Drawing Sheets

| DIGITAL VOLTAGE VALUE (DECIMAL NUMBER) | VOLTAGE VALUE OF ANALOG SIGNAL [V] | AC INPUT VOLTAGE [V] (200 V SYSTEM) |
|---|---|---|
| 526 | 1.6990 | 220.28 |
| 530 | 1.7119 | 221.53 |
| 540 | 1.7442 | 224.67 |
| 550 | 1.7765 | 227.80 |
| 557 | 1.8000 | 230.00 |
| 560 | 1.8088 | 230.94 |
| 570 | 1.8411 | 234.08 |
| 580 | 1.8734 | 237.21 |
| 589 | 1.9025 | 240.03 |
| 590 | 1.9057 | 240.35 |
| 591 | 1.9089 | 240.66 |
| 592 | 1.9122 | 240.98 |

FIG. 6

| AC INPUT VOLTAGE (AC: V) | VOLTAGE VALUE OF ANALOG SIGNAL (DC: V) | DIGITAL VOLTAGE VALUE (DECIMAL NUMBER (HEXADECIMAL NUMBER)) | IDENTIFICATION VALUE OF AC POWER SUPPLY VOLTAGE | POWER CONTROL PARAMETER |
|---|---|---|---|---|
| \|<br>200<br>\|<br>208<br>\| | \|<br>1.4923<br>\|<br>1.5739<br>\| | \|<br>461 (1CD)<br>\|<br>486 (1E6)<br>\| | 208 V | +200 W |
| 215<br>\|<br>220<br>\| | 1.6461<br>\|<br>1.6995<br>\| | 510 (1FE)<br>\|<br>525 (20D)<br>\| | 220 V | +100 W |
| 225<br>\|<br>230<br>\| | 1.7498<br>\|<br>1.8000<br>\| | 541 (21D)<br>\|<br>557 (22D)<br>\| | 230 V | DEFAULT VALUE |
| 235<br>\|<br>240<br>\| | 1.8534<br>\|<br>1.9036<br>\| | 572 (23C)<br>\|<br>588 (24C)<br>\| | 240 V | −200 W |

$V_{ac}$: IDENTIFICATION VALUE OF AC POWER SUPPLY VOLTAGE
$V_{ae}$: IDENTIFICATION VALUE OF VOLTAGE WHICH IS MINIMUM CURRENT
C: AGREEMENT NUMBER BETWEEN PREVIOUS $V_{ac}$ AND CURRENT $V_{ac}$
E: DISAGREEMENT NUMBER BETWEEN PREVIOUS $V_{ac}$ AND CURRENT $V_{ac}$ $V_{ac}$: IDENTIFICATION VALUE OF AC POWER SUPPLY VOLTAGE
$V_{ad}$: IDENTIFICATION VALUE OF AC POWER SUPPLY VOLTAGE OF EACH COUNTRY
C: AGREEMENT NUMBER BETWEEN PREVIOUS $V_{ac}$ AND CURRENT $V_{ac}$
E: DISAGREEMENT NUMBER BETWEEN PREVIOUS $V_{ac}$ AND CURRENT $V_{ac}$ $V_{ac}$: IDENTIFICATION VALUE OF AC POWER SUPPLY VOLTAGE $V_{ae}$: IDENTIFICATION VALUE OF VOLTAGE WHICH IS MINIMUM CURRENT $C_1$ TO $C_n$: AGREEMENT NUMBER BETWEEN PREVIOUS $V_{ac}$ AND CURRENT $V_{ac}$ FOR EACH $V_{ac}$ $C_i$: ONE OF $C_1$ TO $C_n$

E: DISAGREEMENT NUMBER BETWEEN PREVIOUS $V_{ac}$ AND CURRENT $V_{ac}$ $V_{ac}$: IDENTIFICATION VALUE OF AC POWER SUPPLY VOLTAGE $V_{ad}$: IDENTIFICATION VALUE OF AC POWER SUPPLY VOLTAGE OF EACH COUNTRY $C_1$ TO $C_n$: AGREEMENT NUMBER BETWEEN PREVIOUS $V_{ac}$ AND CURRENT $V_{ac}$ FOR EACH $V_{ac}$ $C_i$: ONE OF $C_1$ TO $C_n$

E: DISAGREEMENT NUMBER BETWEEN PREVIOUS $V_{ac}$ AND CURRENT $V_{ac}$ $V_{ac}$: IDENTIFICATION VALUE OF AC POWER SUPPLY VOLTAGE
C: AGREEMENT NUMBER BETWEEN PREVIOUS $V_{ac}$ AND CURRENT $V_{ac}$
E: DISAGREEMENT NUMBER BETWEEN PREVIOUS $V_{ac}$ AND CURRENT $V_{ac}$
V_AC [0] TO V_AC [4]: BUFFERS IN WHICH $V_{ac}$ IS STORED
V_ER [0] TO V_ER [4]: BUFFERS IN WHICH CURRENT $V_{ac}$ DISAGREEING WITH PREVIOUS $V_{ac}$ IS STORED

POWER CONTROL APPARATUS, IMAGE FORMING APPARATUS, AND POWER CONTROL PROGRAM PRODUCT

CROSS-REFERENCE TO RELATED APPLICATIONS

The present application claims priority to and incorporates by reference the entire contents of Japanese Patent Application No. 2010-017442 filed in Japan on Jan. 28, 2010 and Japanese Patent Application No. 2010-226768 filed in Japan on Oct. 6, 2010.

BACKGROUND OF THE INVENTION

1. Field of the Invention

The present invention relates to a power control apparatus, an image forming apparatus, and a power control program.

2. Description of the Related Art

In general, an image forming apparatus such as a copying machine supplies power from a commercial power supply (AC power supply) to a fixing heater to monitor the temperature of a fixing unit incorporating the fixing heater therein. The image forming apparatus controls the supply of power to the fixing heater by controlling the duty of a feeding time and a non-feeding time per unit time in the fixing heater depending on the temperature of the monitored fixing unit, and performs temperature control of the fixing unit.

However, if the temperature of the fixing unit is controlled under the same conditions when the power supply voltage of the commercial power supply varies depending on user's locations (regions where image forming apparatus are used), the input voltage from a commercial power supply may be equal to or higher than the rated voltage. In this case, the fixing heater may consume the power greater than the required power.

Therefore, Japanese Patent Application Laid-open No. 2004-233745 discloses a technique capable of controlling the power consumption of the fixing heater by detecting the input voltage from a commercial power supply and controlling the duty of the feeding time and the non-feeding time per unit time in the fixing heater in response to the detected input voltage.

In the related technique disclosed in Japanese Patent Application Laid-open No. 2004-233745, however, when a noise intrudes into the commercial power supply, the input voltage from the commercial power supply may be detected erroneously. Therefore, there is a possibility that the power may not be appropriately controlled.

The present invention is contrived in view of the above-mentioned circumstance, and an object of the present invention is to provide a power control apparatus, an image forming apparatus, and a power control program capable of appropriately controlling power even when a noise intrudes into a commercial power supply.

According to the invention, it is possible to obtain the advantage of appropriately controlling the power, even when a noise intrudes into a commercial power supply.

SUMMARY OF THE INVENTION

It is an object of the present invention to at least partially solve the problems in the conventional technology.

According to an aspect of the present invention, there is provided a power control apparatus including: a reception unit sequentially receiving input of voltage values indicating AC input voltages from AC power supplies; a power control table storage unit storing a power control table in which a power control parameter corresponding to the AC power supply voltage is matched with each group of the voltage values indicating the same AC power supply voltage; a decision unit determining to which group the received voltage values belong among the plurality of groups, whenever the reception unit receives the input of the voltage value and deciding the group, to which a predetermined number of voltage values belongs among the plurality of voltage values sequentially received by the reception unit, among the plurality of groups using the determination result; and a power control unit controlling power supply according to the power control parameter matched with the decided group.

According to another aspect of the present invention, there is provided an image forming apparatus including: a power control apparatus, wherein the power control apparatus includes, a reception unit sequentially receiving input of voltage values indicating AC input voltages from AC power supplies; a power control table storage unit storing a power control table in which a power control parameter corresponding to the AC power supply voltage is matched with each group of the voltage values indicating the same AC power supply voltage; a decision unit determining to which group the received voltage values belong among the plurality of groups, whenever the reception unit receives the input of the voltage value and deciding the group, to which a predetermined number of voltage values belongs among the plurality of voltage values sequentially received by the reception unit, among the plurality of groups using the determination result; and a power control unit controlling power supply according to the power control parameter matched with the decided group.

According to another aspect of the present invention, there is provided a power control program product comprising a computer usable medium having computer readable program codes embodied in the medium that when executed causes a computer to execute the steps of: causing a reception unit to sequentially receive input of voltage values indicating an AC input voltage from an AC power supply; causing a decision unit to determine that to which group the received voltage values belong among the plurality of groups, whenever the reception unit receives the input of the voltage value in the deciding step with reference to a power control table stored in a power control table storage unit storing the power control table in which a power control parameter corresponding to the AC power supply voltage is matched with each group of the voltage values indicating the same AC power supply voltage, and to decide deciding the group, to which a predetermined number of voltage values belongs among the plurality of voltage values sequentially received in the deciding step, among the plurality of groups using the determination result; and causing a power control unit to control power supply according to the power control parameter matched with the decided group.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 6 is a diagram illustrating an example of a power control table;

DETAILED DESCRIPTION OF THE PREFERRED EMBODIMENTS

Hereinafter, a power control apparatus, an image forming apparatus, and a power control program according to embodiments of the invention will be described with reference to the accompanying drawings. In the following embodiments, the description is made with a case in which the power control apparatus is applied to a copying machine which is an example of the image forming apparatus to perform fixing control. However, the invention is not limited thereto.

First Embodiment

First, the configuration of the power control apparatus applied to the copying machine according to a first embodiment will be described.

Figure 1:
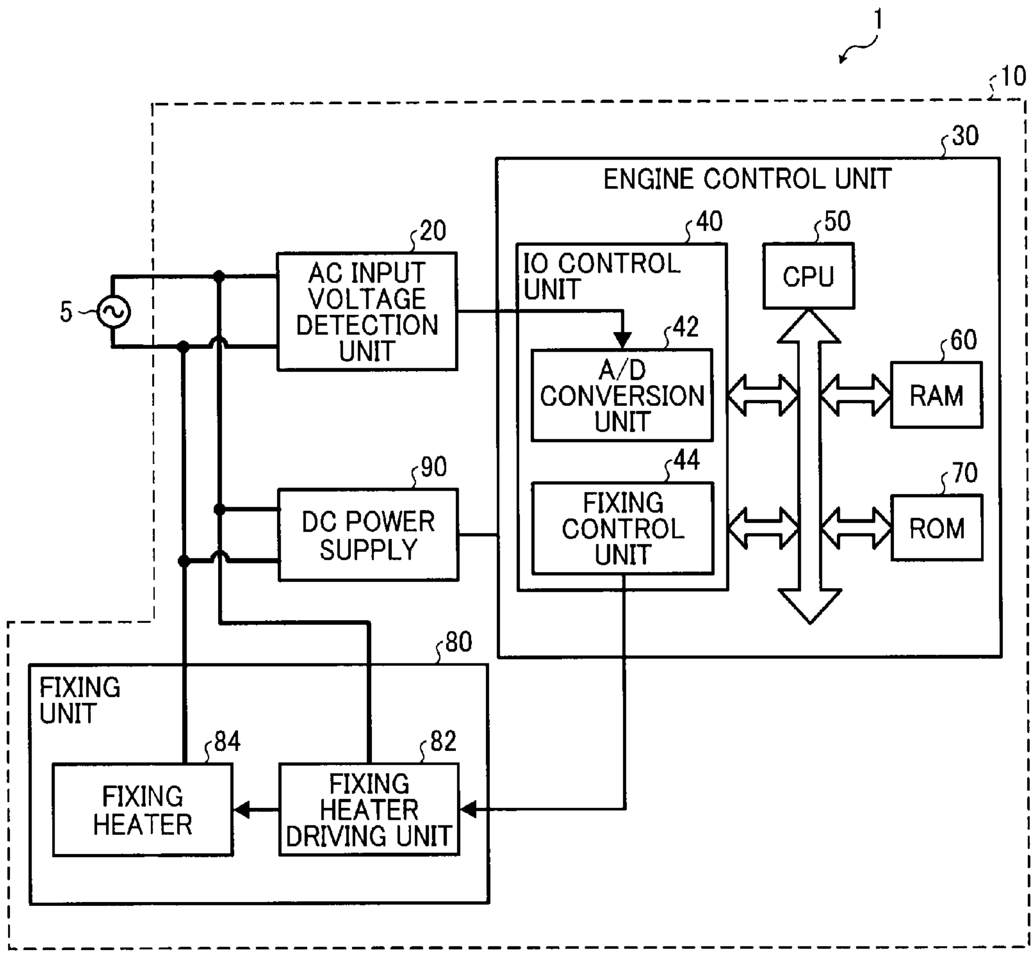
FIG. 1 is a block diagram illustrating an exemplary configuration of a power control apparatus applied to a copying machine according to a first embodiment.

FIG. 1 is a block diagram illustrating an exemplary configuration of a power control apparatus 10 applied to a copying machine 1 according to the first embodiment. As shown in FIG. 1, the power control apparatus 10 includes an AC input voltage detection unit 20, an engine control unit 30, a fixing unit 80, and a DC power supply 90.

The AC input voltage detection unit 20 detects AC input voltage from an AC power supply 5. The "AC input voltage" means an instantaneous value which is an instantaneous voltage of the AC power supply 5. The fixing unit 80 receives electric power from the AC power supply 5 and fixes image data read by a reading device (not shown) such as a scanner and written on a photoconductive drum (not shown) to a recording medium such as a transfer sheet. The fixing unit 80 includes a fixing heater driving unit 82 and a fixing heater 84. The DC power supply 90 converts the AC power from the AC power supply 5 into DC power and supplies the converted DC power to the engine control unit 30. The engine control unit 30 performs fixing control of the fixing unit by controlling the electric power fed from the AC power supply 5 to the fixing unit 80 using the AC input voltage detected by the AC input voltage detection unit 20. The engine control unit 30 includes an IO control unit 40, a CPU (Central Processing Unit) 50, a RAM (Random Access Memory) 60, and a ROM (Read-Only Memory) 70.

Figure 2:
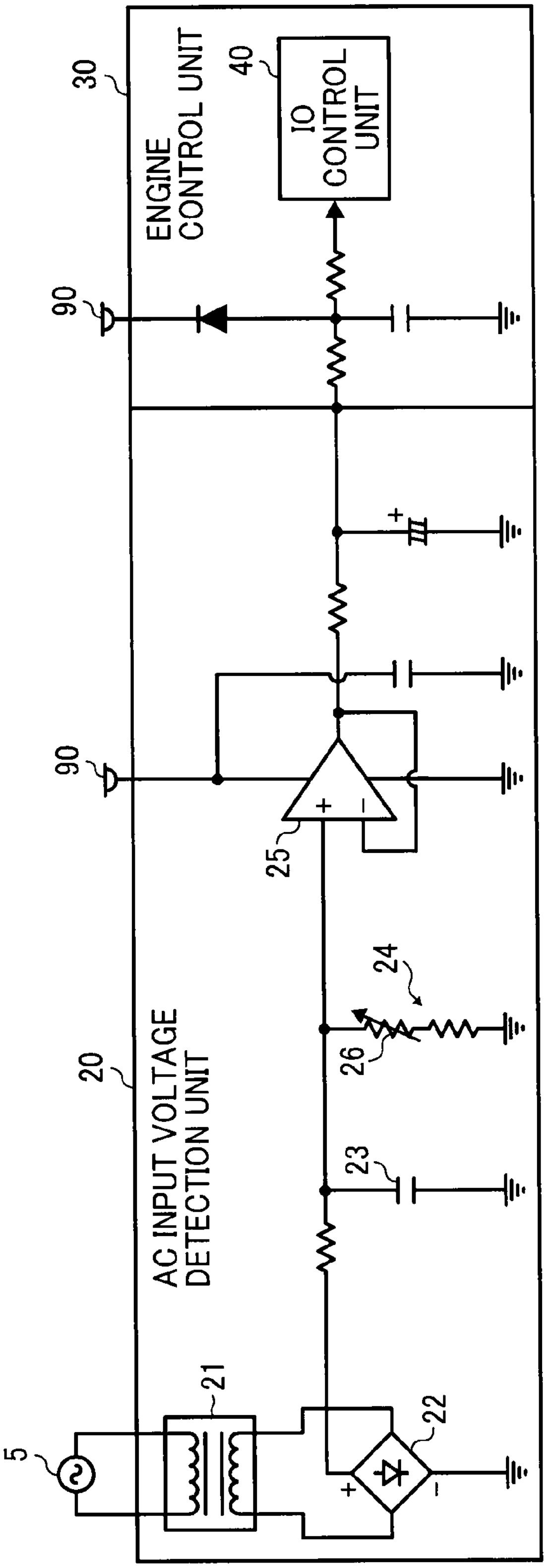
FIG. 2 is a circuit diagram illustrating an exemplary configuration of an AC input voltage detection unit according to the first embodiment.

FIG. 2 is a circuit diagram illustrating an exemplary configuration of the AC input voltage detection unit 20 according to the first embodiment. As shown in FIG. 2, the AC input voltage detection unit 20 includes a transformer 21, a bridge diode 22, a smoothing condenser 23, a voltage division resistor 24 such as a variable resistor 26, and an operational amplifier 25.

When the AC power is input from the AC power supply 5, the transformer 21 having a predetermined turn ratio insulates AC power from an analog signal voltage and drops the voltage up to a voltage level appropriate for the analog signal voltage used in an internal circuit. The bridge diode 22 performs full-wave rectification on the output voltage of the secondary side of the transformer 21. The smoothing condenser 23 smoothes the voltage subjected to the full-wave rectification. The voltage division resistor 24 divides the smoothed voltage. The operational amplifier 25, which is an example of an impedance conversion circuit, receives the voltage smoothed by the smoothing condenser 23 or the voltage divided by the voltage division resistor 24 and outputs it as the voltage value of an analog signal to the IC control unit 40 of the engine control unit 30.

Thus, the AC input voltage detection unit 20 detects the AC input power from the AC power supply 5 as the voltage value of the analog signal and outputs the voltage value to the IO control unit 40. The voltage value of the analog signal has a given proportional relation or a correlation with the AC input voltage from the AC power supply 5, and thus is adjusted by the variable resistor 26. For example, in the first embodiment, when the AC input voltage from the AC power supply 5 is AC 230 V, the voltage value of the analog signal is adjusted by the variable resistor 26 so that the voltage value of the analog signal is DC 1.8 V.

Referring back to FIG. 1, the IO control unit 40 connects the engine control unit 30 to the AC input voltage detection unit 20 and the fixing unit 80, and includes an A/D conversion unit 42 and a fixing control unit 44.

The A/D conversion unit 42 converts the voltage value of the analog signal input from the AC input voltage detection unit 20 into a digital voltage value. For example, the A/D conversion unit 42 keeps an A/D conversion table in which voltage values of the analog signal are matched with the digital voltage values and converts the voltage value of the analog signal into the digital voltage value with reference to the A/D conversion table. For example, the A/D conversion unit 42 may keep a conversion equation used to convert the voltage value of the analog signal into the digital voltage value and converts the voltage value of the analog signal into the digital voltage value using the conversion equation.

Figures 3, 4:
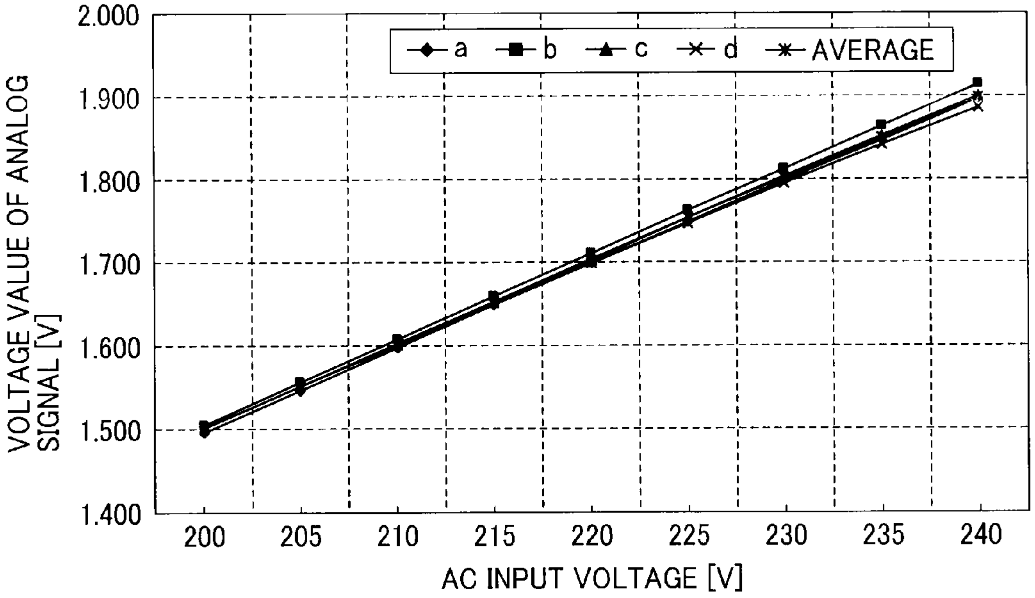
FIG. 3 is a diagram illustrating an example of an A/D conversion table according to the first embodiment.
FIG. 4 is a graph illustrating an example of a correspondence relation between AC input voltages and voltage values of an analog signal.

FIG. 3 is a diagram illustrating an example of the A/D conversion table. In the exemplary A/D conversion table shown in FIG. 3, the digital voltage values, the voltage values of an analog signal, and the AC input voltages are matched with each other. When the AC input voltage is converted into the voltage value of the analog signal, a slight error occurs in each AC input voltage detection unit mounted in the copying machine (power control apparatus). Therefore, in the first embodiment, as shown in FIG. 4, the voltage values of the analog signal are measured by a plurality of trial products (trial products a to d) when the AC input voltage is varied, the measured values are averaged, and the voltage values of the analog signal are matched with the AC input voltages to generate the A/D conversion table shown in FIG. 3. In the A/D conversion table shown in FIG. 3, the digital voltage values are expressed by 10-bit data (hereinafter, the digital voltage values are explained with decimal numbers). A voltage value 0.00323 V of the analog signal corresponds to a digital voltage value 1.

Therefore, when the AC input voltage from the AC power supply 5 is 230 V, the A/D conversion unit 42 converts a voltage value 1.8 V of the analog signal input from the AC input voltage detection unit 20 into a digital voltage value 557 with reference to the A/D conversion table shown in FIG. 3.

The fixing control unit 44 will be described in detail below.

Figure 5:
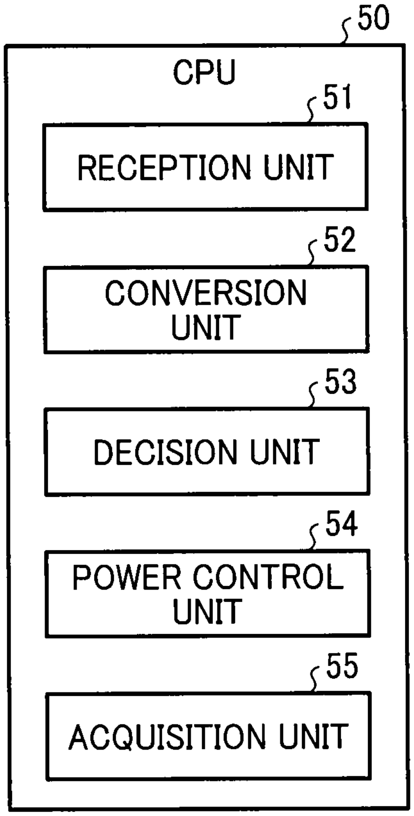
FIG. 5 is a block diagram illustrating an exemplary functional configuration of a CPU according to the first embodiment.

The CPU 50 uses the RAM 60 as a work area and controls the entire power control apparatus 10. In the first embodiment, as shown in FIG. 5, the CPU 50 functions as a reception unit 51, a conversion unit 52, a decision unit 53, a power control unit 54, and an acquisition unit 55.

The power control program executed in the power control apparatus 10 is incorporated in advance in the ROM 70 or the like to be provided. The power control program executed in the power control apparatus 10 may be recorded and supplied in the form of a file that is installable or executable in a computer-readable storage medium such as a CD-ROM, a flexible disk (FD), a CD-R, or a DVD.

The power control program executed in the power control apparatus 10 may be stored in a computer connected to a network such as the Internet and may be downloaded via the network for supply. Alternatively, the power control program executed in the power control apparatus 10 may be supplied or distributed via a network such as the Internet.

The power control program executed in the power control apparatus 10 includes modules realizing the above-described respective units on a computer. In an actual hardware, the CPU 50 realizes the respective units on a computer by reading the power control program from the ROM 70 to the RAM 60

The reception unit 51 sequentially receives the input voltage values indicating the AC input voltage from the AC power supply 5. Specifically, the reception unit 51 sequentially receives as the voltage values indicating the AC input voltages from the AC power supply 5, the digital voltage values of the AC input voltages, from the A/D conversion unit 42. The reception unit 51 may correct the received digital voltage values according to the method disclosed in Japanese Patent Application Laid-open No. 2004-233745. Thus, various errors can be reduced.

The ROM 70 is a read-only memory that stores programs executed by the CPU 50, or data. In the first embodiment, the ROM 70 functions as a power control table storage unit that stores the power control table in which power control parameters corresponding to the AC power supply voltages are matched with voltage value groups indicating the same AC power supply voltage. The "AC power supply voltage" means a voltage execution value of the AC power supply 5. The power control table storage unit may be realized by not only the ROM but also the existing storage device, such as a Hard Disk Drive (HDD), a Solid State Drive (SSD), a memory card, or an optical disk capable of magnetically, optically, or electrically storing data. The RAM 60 may function as the power control table storage unit by developing the power control table stored in the ROM 70 into the RAM 60.

FIG. 6 is a diagram illustrating an example of the power control table. In the example of the power control table shown in FIG. 6, groups of the AC input voltages, groups of voltage values of the analog signal, groups of the digital voltage values, and identification values of the AC power supply voltages, and the power control parameters are matched with each other. The AC power supply voltage is different in every country. In the example shown in FIG. 6, the AC power supply voltage of North America is 208 V, the AC power supply voltage of China is 220 V, the AC power supply voltage of Germany is 230 V, and the AC power supply voltage of British is 240 V. In the example shown in FIG. 6, 230 V is set as a default value (for example, 2400 W) for the power control. Therefore, in a case of the other AC power supply voltages, the power is controlled by changing the amount of power using the default value as a reference.

Referring back to FIG. 5, whenever the reception unit 51 receives the input of the voltage value, the conversion unit 52 converts the received voltage value into an identification value matched with the received voltage value. Specifically, whenever the reception unit 51 receives the input of the digital voltage value, the conversion unit 52 converts the received digital voltage value into the identification value of the AC power supply voltage matched therewith with reference to the power control table.

The decision unit 53 determines to which group the received voltage value belongs among the plurality of groups, whenever the reception unit 51 receives the voltage value as an input. Then, the decision unit 53 decides the group to which a given number of voltage values belongs among the plurality of voltage values sequentially received by the reception unit 51, among the plurality of groups, using the determination result. Specifically, the decision unit 53 determines whether the identification value of the current AC power supply voltage agrees with the identification value of the previous AC power supply voltage, whenever the conversion unit 52 performs the conversion. Then, the decision unit 53 decides the identification value when the determination results, each indicating the agreement is obtained continuously a predetermined number of times. That is, in the example shown in FIG. 6, the decision unit 53 determines whether the AC power supply voltage of the AC power supply 5 is one of 208 V, 220 V, 230 V, and 240 V.

The decision unit 53 decides the identification value indicating a predetermined voltage, when the number of the determination results, each indicating the disagreement reaches a predetermined value. Specifically, the decision unit 53 decides the identification value indicating the voltage which is the minimum current, when the number of the determination results, each indicating the disagreement reaches the predetermined value.

The power control unit 54 controls the supply of the power according to the power control parameter matched with the group decided by the decision unit 53. Specifically, the power control unit 54 controls the supply of the power according to the power control parameter matched with the identification value of the current AC power supply voltage decided by the decision unit 53.

The acquisition unit 55 acquires the identification value of the AC power supply voltage of each country which is the AC power supply voltage corresponding to a destination region.

Referring back to FIG. 1, the fixing control unit 44 receives an instruction from the power control unit 54 and controls the supply of the power to the fixing heater driving unit 82.

The fixing heater driving unit 82 controls the supply of the power to the fixing heater 84 by turning on/off the fixing heater 84 and is realized by a circuit or the like.

The fixing heater 84 is a heater that heats or pressurizes a fixing roller (not shown).

The power control apparatus 10 may not include all of the above-described units as essential units but may eliminate some of the units.

Next, the operation of the power control apparatus according to the first embodiment will be described.

Figure 7:
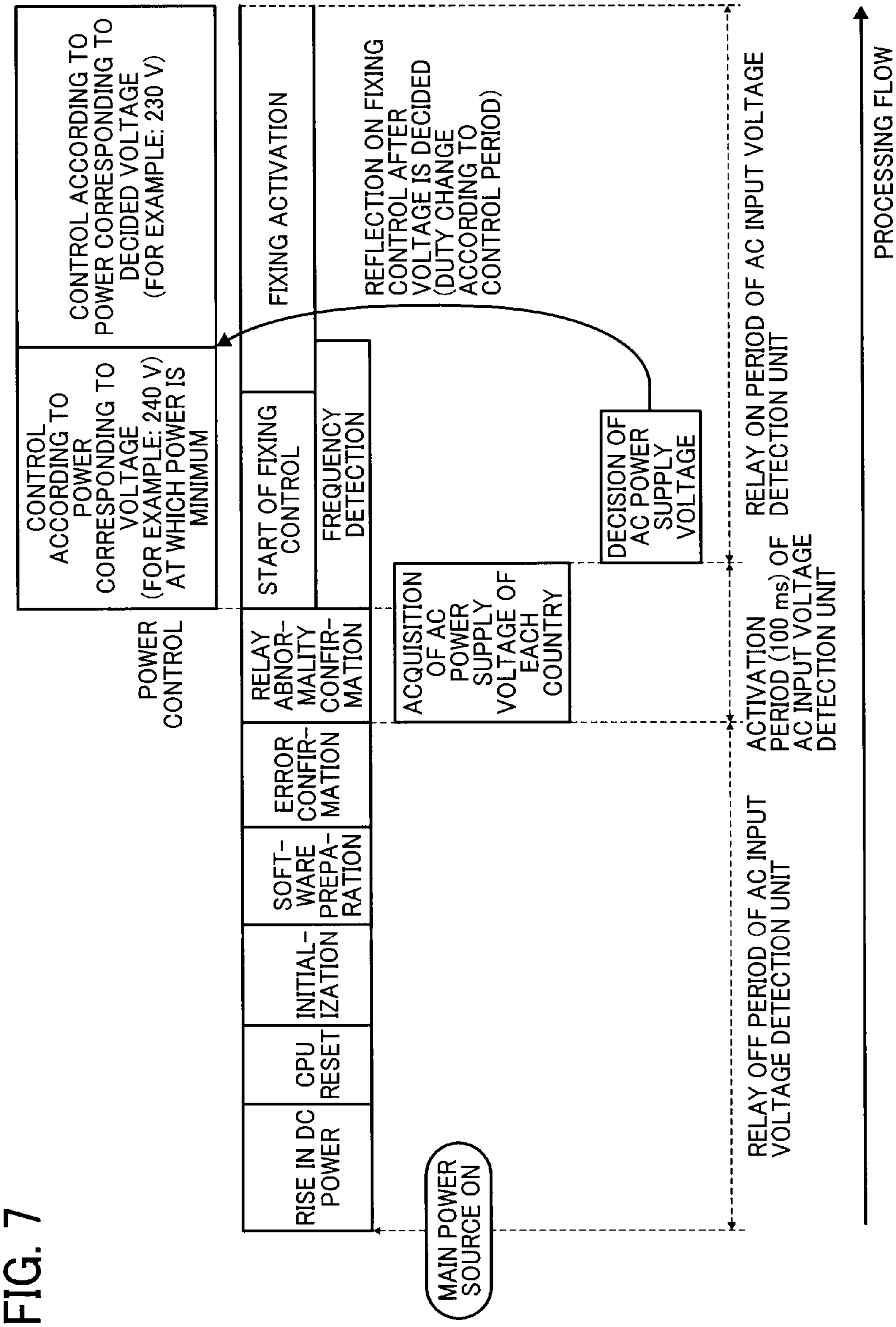
FIG. 7 is a diagram illustrating an example of a relationship between the state of the AC input voltage detection unit and the power control of a fixing unit after the start of the copying machine according to the first embodiment.

FIG. 7 is a diagram for explaining an example of a relationship between the state of the AC input voltage detection unit 20 and the power control of the fixing unit 80 after the start of the copying machine 1 according to the first embodiment.

As shown in FIG. 7, the AC input voltage detection unit 20 is turned off by a relay to save energy until error confirmation by the copying machine 1 ends, although the main power supply of the copying machine 1 is turned on. In addition, it takes about 100 ms to convert and activate the AC input voltage detection unit 20 from relay-off to relay-on. Therefore, it is difficult to decide the AC power supply voltage when the fixing control by the fixing unit 80 starts. Hereinafter, an example will be described in which the power control apparatus 10 according to the first embodiment performs control with the power corresponding to the voltage which yields consumption of minimum power (minimum current) and performs control with the power corresponding to the voltage that is decided after the AC power supply voltage is decided, when the fixing control by the fixing unit 80 starts. Thus, it is possible to prevent the voltage from exceeding the maximum current value.

Figure 8:
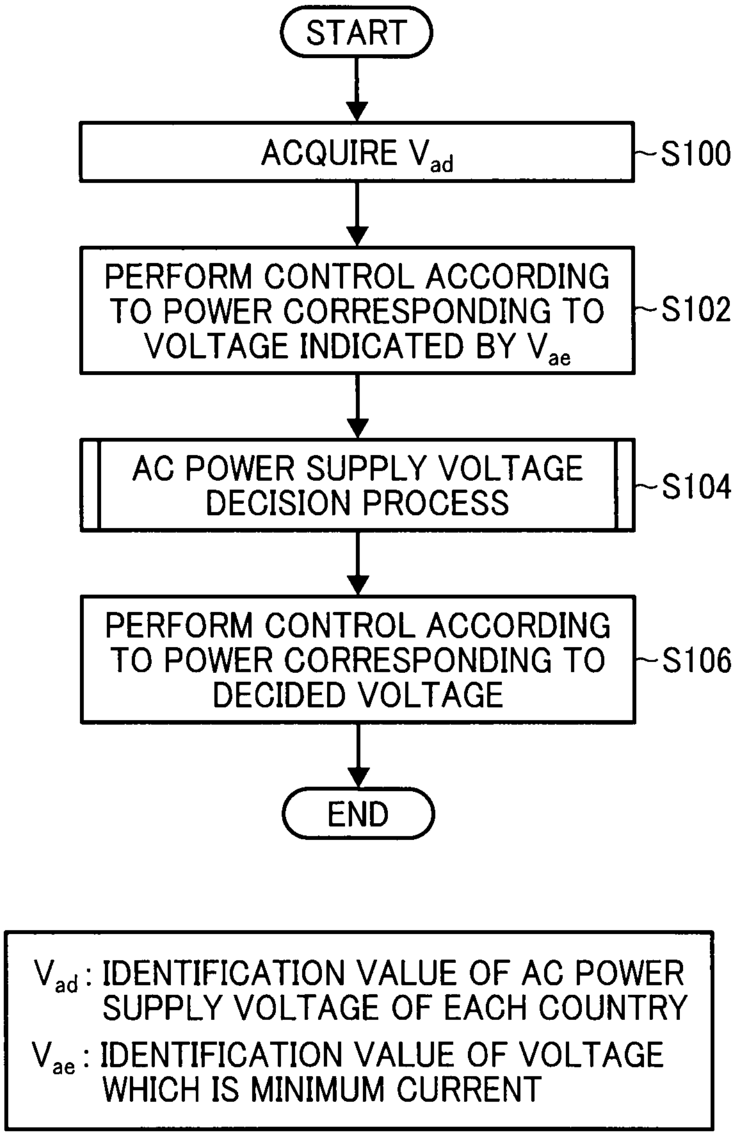
FIG. 8 is a flowchart illustrating an example of power control performed by the power control apparatus according to the first embodiment.

FIG. 8 is a flowchart illustrating an example of the sequence of the flow of the power control performed by the power control apparatus 10 according to the first embodiment.

In Step S100, the acquisition unit 55 acquires an identification value $V_{ad}$ of the AC power supply voltage of each country which is the AC power supply voltage of the destination region, when the AC input voltage detection unit 20 starts to be activated.

In Step S102, the power control unit 54 acquires an identification value $V_{ae}$ of the voltage which yields the minimum current from ROM 70 and performs the fixing control of the fixing unit 80 with the power corresponding to the voltage indicated by the identification value $V_{ae}$.

In Step S104, when the relay of the AC input voltage detection unit 20 is turned on, the reception unit 51, the conversion unit 52, and the decision unit 53 perform an AC power supply voltage decision process. The AC power supply voltage decision process will be described in detail below.

In Step S106, the power control unit 54 performs the fixing control of the fixing unit 80 with the power corresponding to the voltage which is decided in the AC power supply voltage decision process.

Figure 9:
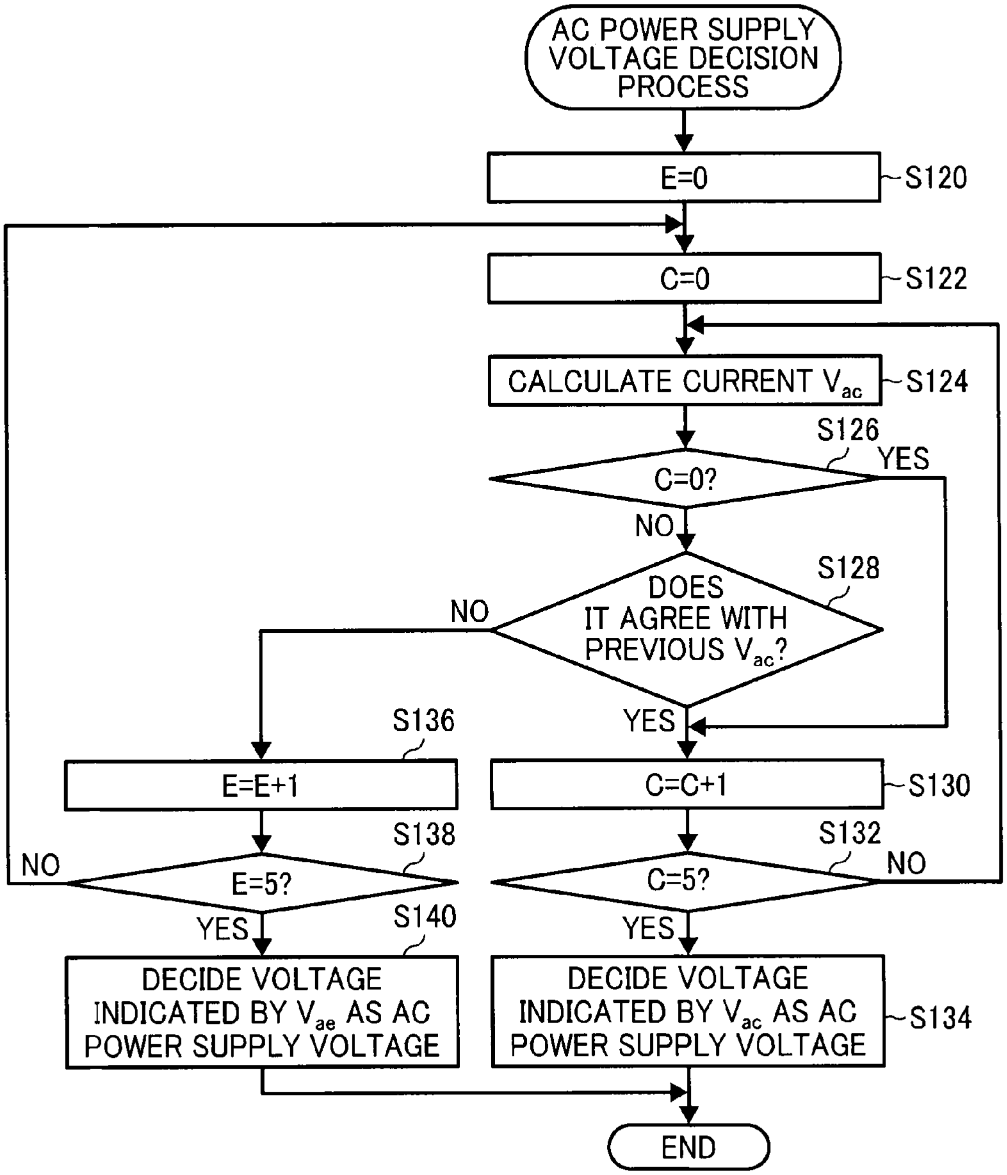
FIG. 9 is a flowchart illustrating an example of an AC power supply voltage decision process according to the first embodiment.

FIG. 9 is a flowchart illustrating an example of the sequence to the flow of the AC power supply voltage decision process according to the first embodiment.

First, In Step S120, the decision unit 53 initializes a variable E indicating the number of disagreements between the current value and the previous value of an identification value $V_{ac}$ of the AC power supply voltage calculated from the AC input voltage, to 0.

Subsequently, in Step S122, the decision unit 53 initializes a variable C, which indicates the agreement number between the current and previous identification values $V_{ac}$, to 0.

Subsequently, in Step S124, the conversion unit 52 calculates the current identification value $V_{ac}$. Specifically, the conversion unit 52 converts the digital voltage value of the AC input voltage received by the reception unit 51 into the identification value of the AC power supply voltage which is matched therewith with reference to the power control table shown in FIG. 6. The conversion unit 52 stores the previously calculated identification value $V_{ac}$ (previous identification value $V_{ac}$) in the RAM 60 before calculating the current identification value $V_{ac}$.

Subsequently, in Step S126, the decision unit 53 confirms whether the value of the variable C is 0.

In Step S128, when the variable C is not 0 (No in Step S126), the decision unit 53 confirms whether the current identification value $V_{ac}$ and the previous identification value $V_{ac}$ agree with each other.

In Step S130, when the variable C is 0 (Yes in Step S126) or when the current identification value $V_{ac}$ and the previous identification value $V_{ac}$ agree with each other (Yes in Step S128), the decision unit 53 increments the value of the variable C.

Subsequently, in Step S132, the decision unit 53 confirms whether the value of the variable C is 5.

In Step S134, when the value of the variable C is 5 (Yes in Step S132), the decision unit 53 decides the voltage indicated by the current identification value $V_{ac}$ as the AC power supply voltage.

When the value of the variable C is not 5 (No in Step S132), the process returns to Step S124 and the conversion unit 52 calculates the current identification value $V_{ac}$.

In Step S136, when the current identification value $V_{ac}$ and the previous identification value $V_{ac}$ do not agree with each other in Step S128 (No in Step S128), the decision unit 53 increments the value of the variable E.

Subsequently, in Step S138, the decision unit 53 confirms whether the value of the variable E is 5.

In Step S140, when the value of the variable E is 5 (Yes in Step S138), the decision unit 53 decides the voltage indicated by the identification value $V_{ae}$ which yields the minimum current as the AC power supply voltage.

When the value of the variable E is not 5 (No in Step S138), the process returns to Step S122 and the decision unit 53 initializes the value of the variable C to 0.

When the identification value $V_{ac}$ of the AC power supply voltage calculated from the AC input voltage agrees continuously four times in the above-described processes(in the case in which the identification value $V_{ac}$ is calculated five times), the voltage indicated by the identification value $V_{ac}$ is decided as the AC power supply voltage. When the disagreement number between the current and previous identification values $V_{ac}$ of the AC power supply voltages calculated from the AC input voltage reaches five, the voltage indicated by the identification value $V_{ae}$ of the voltage which yields the minimum current is decided as the AC power supply voltage.

For example, when the digital voltage values of the AC input voltages received by the reception unit 51 are 535, 543, 550, 557, 560, 555, and 557, the identification values $V_{ac}$ calculated by the conversion unit 52 become 220 V, 230 V, 230 V, 230 V, 230 V, 230 V, and 230 V, respectively. In this case, after 220 V (535) and 230 V (543) disagree with each other as the comparison result, the identification values $V_{ac}$ become 230 V continuously five times and thus agree with each other continuously four times. Therefore, 230 V is decided as the AC power supply voltage. In this way, the fixing unit 80 performs the fixing control according to the power (for example, 2400 W) of the default value.

For example, when the digital voltage values of the AC input voltages received by the reception unit 51 are 525, 545, 574, 544, 580, 544, 560, 577, 575, 590, and 566, the identification values $V_{ac}$ calculated by the conversion unit 52 become 220 V, 230 V, 240 V, 230 V, 240 V, 230 V, 230 V, 240 V, 240 V, 240 V, and 230 V, respectively. In this case, since 220 V (525) and 230 V (545) disagree with each other as the comparison result, 240 V (574) and 230 V (544) disagree with each other as the comparison result, 240 V (580) and 230 V (544) disagree with each other as the comparison result, 230 V (560) and 240 V (577) disagree with each other as the comparison result, and 240 V (590) and 230 V (566) disagree with each other as the comparison result and thus the disagreement number becomes five, 240 V which yields the minimum current is decided as the AC power supply voltage. Thus, the fixing control of the fixing unit 80 is performed with the power (for example, 2200 W) of the default value of −200 W, thereby preventing the current value from exceeding the maximum current value.

In the example show in FIG. 9, the case has hitherto been described in which the voltage indicated by the identification value $V_{ac}$ is decided as the AC power supply voltage when the identification values $V_{ac}$ of the AC power supply voltage calculated from the AC input voltage agree with each other continuously four times. However, the continuous agreement number necessary for deciding the AC power supply voltage is not limited thereto, but may be appropriately set. Likewise, in the example shown in FIG. 9, the case has hitherto been described in which the voltage indicated by the identification value $V_{ae}$ of the voltage which is the minimum current is decided as the AC power supply voltage, when the disagreement number between the current and previous identification values $V_{ac}$ reaches five. However, the disagreement number necessary for deciding the AC power supply voltage is not limited thereto, but may be appropriately set.

In this first embodiment, even in a case where the AC input voltage is erroneously detected due to the noise intruded into the AC power supply, the voltage indicated by the identification value is not decided as the AC power supply voltage when the identification values of the AC power supply voltages calculated from the AC input voltages do not agree with each other continuously the predetermined number of times. Accordingly, in the first embodiment, it is possible to prevent the voltage from being erroneously decided as the AC power supply voltage with high precision, thereby appropriately performing the power control so that the consumption power does not increase or the fixing failure does not occur.

In the first embodiment, the voltage which yields the minimum current is decided as the AC power supply voltage, when the disagreement number between the current and previous identification values of the AC power supply voltages calculated from the AC input voltages reaches the predetermined number. Accordingly, it is possible to prevent the voltage from exceeding the maximum current value.

Modification of First Embodiment

In the first embodiment, the case has hitherto been described in which the voltage which yields the minimum current is decided as the AC power supply voltage, when the disagreement number between the current and previous identification values of the AC power supply voltages calculated from the AC input voltages reaches the predetermined number. However, the AC power supply voltage of each country may be decided.

Figure 10:
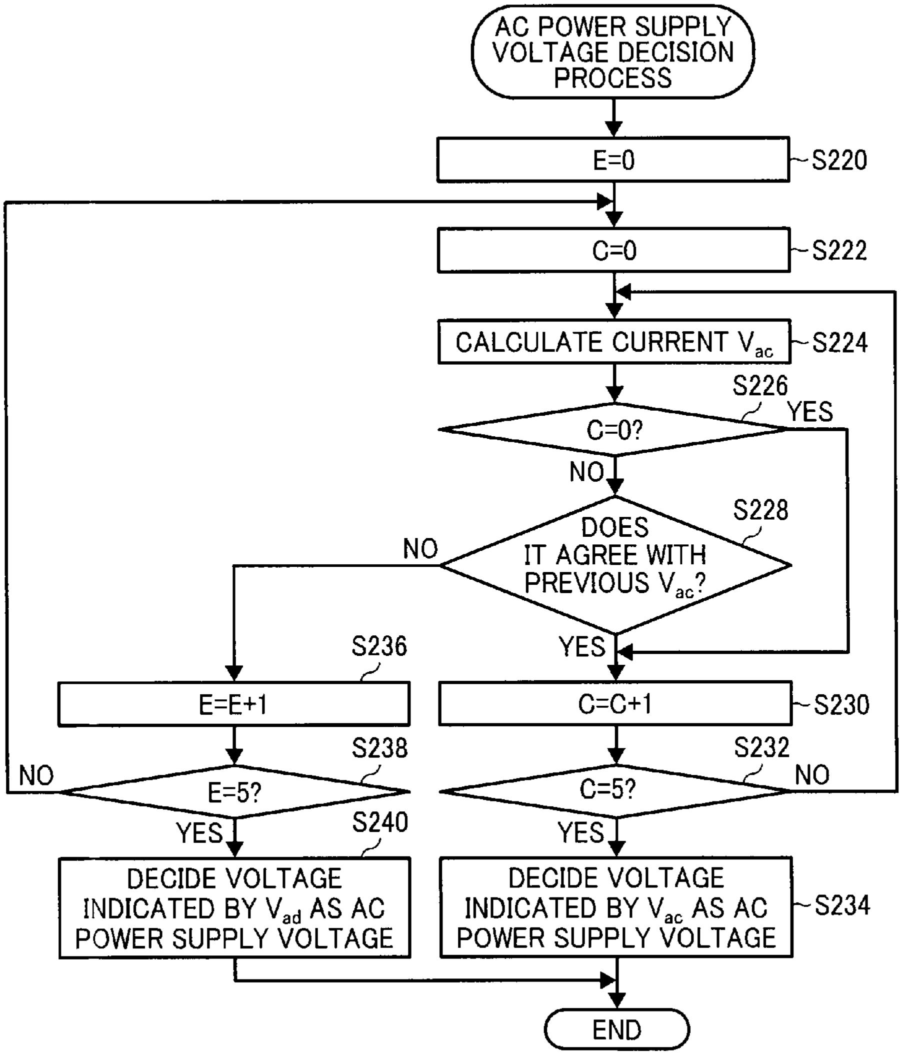
FIG. 10 is a flowchart illustrating an example of an AC power supply voltage decision process according to a modification of the first embodiment.

FIG. 10 is a flowchart illustrating an example of the sequence of the flow of the AC power supply voltage decision process according to a modification of the first embodiment.

Since the processes from Step S220 to Step S238 are the same as the processes from Step S120 to Step S138 of the flowchart shown in FIG. 9, the description will not be repeated.

In Step S240, when the value of the variable E is 5 (Yes in Step S238), the decision unit 53 decides the voltage indicated by the identification value $V_{ad}$ of the AC power supply voltage of each country as the AC power supply voltage.

According to the above-described process, the voltage indicated by the identification value $V_{ad}$ of the AC power supply voltage of each country is decided as the AC power supply voltage, when the disagreement number between the current and previous identification values $V_{ac}$ of the AC power supply voltages calculated from the AC input voltages reaches five. For example, when the copying machine 1 according to the modification of the first embodiment is shipped in Germany, 230 V is decided as the AC power supply voltage since the identification value $V_{ad}$ of the AC power supply voltage of each country is 230 V. Thus, the fixing control of the fixing unit 80 is performed with the power (for example, 2400 W) of the default value.

Second Embodiment

In a second embodiment, a case will be described in which a voltage indicated by an identification value of an AC power supply voltage is decided as an AC power supply voltage when an agreement number between a current and previous identification values of AC power supply voltages calculated from AC input voltages reaches a predetermined number. Hereinafter, the difference between the second embodiment and the first embodiment will mainly be described. The same names and reference numerals as those of the first embodiment are given to the constituent elements having the same functions as those of the first embodiment, and the description thereof will not be repeated.

Figure 11:
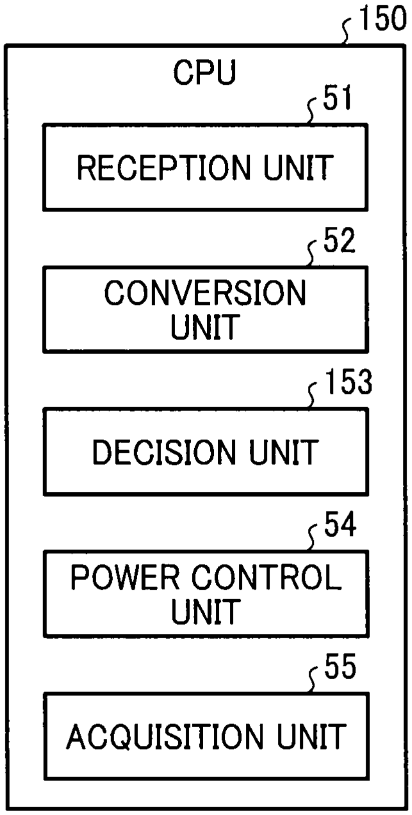
FIG. 11 is a block diagram illustrating an exemplary functional configuration of a CPU according to a second embodiment.

FIG. 11 is a block diagram illustrating an exemplary functional configuration of a CPU 150 according to the second embodiment. In the second embodiment, the processing details of a decision unit 153 are different from those of the first embodiment.

The decision unit 153 determines whether the identification value of the current AC power supply voltage agrees with the identification value of the previous AC power supply voltage whenever the conversion unit 52 performs the conversion. When the determination result indicating the agreement reaches a predetermined number, the decision unit 153 decides the identification value.

Figure 12:
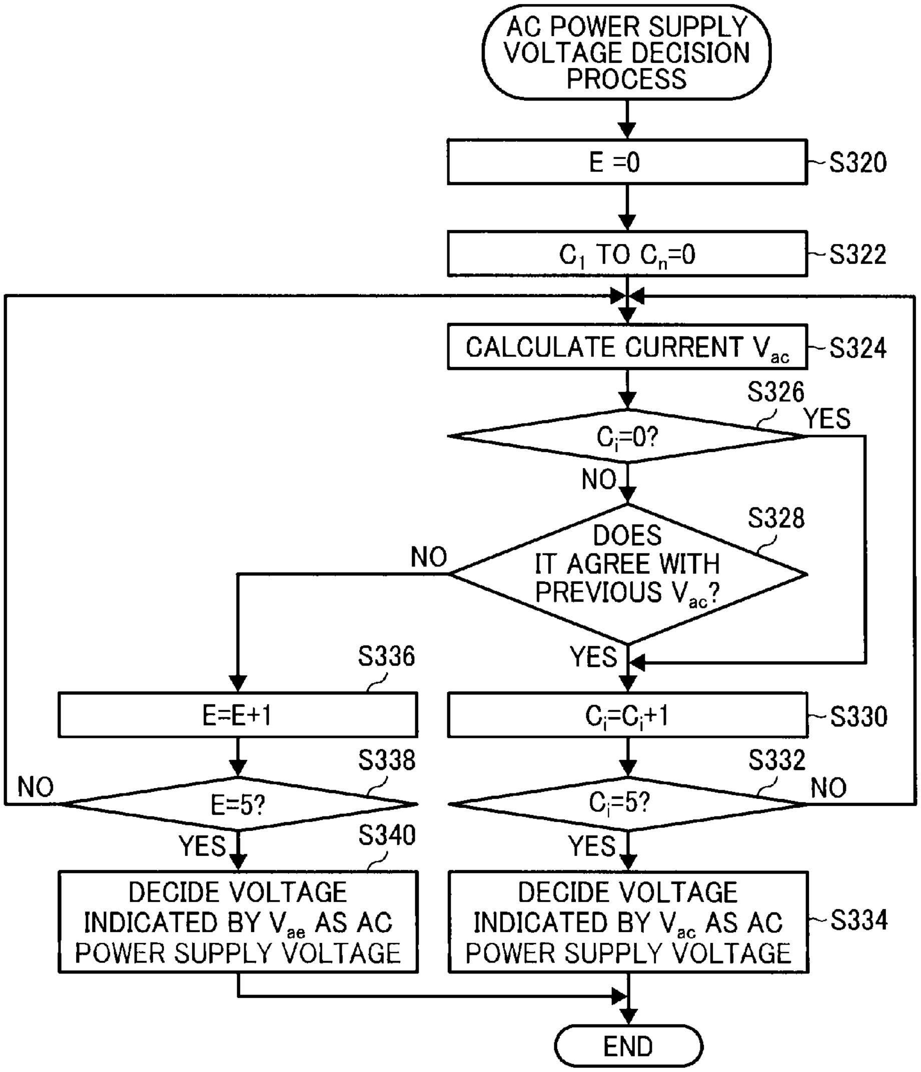
FIG. 12 is a flowchart illustrating an example of the AC power supply voltage decision process according to the second embodiment.

FIG. 12 is a flowchart illustrating an example of the sequence of flow of the AC power supply voltage decision process according to the second embodiment.

First, in Step S320, the decision unit 153 initializes a value of a variable E, which indicates the disagreement number between the current and previous identification values $V_{ac}$ of the AC power supply voltages calculated from the AC input voltages, to 0.

Subsequently, in Step S322, the decision unit 153 initializes the variables $C_1$ to $C_n$, which each indicate the agreement number between the current and previous identification values $V_{ac}$ for each identification value $V_{ac}$, to 0. In the second embodiment, when n=4, the variable $C_1$ indicates the agreement number of identification values $V_{ac}$ in 208 V, the variable $C_2$ indicates the agreement number of identification values $V_{ac}$ in 220 V, the variable $C_3$ indicates the agreement number of identification values $V_{ac}$ in 230 V, and the variable $C_4$ indicates the agreement number of identification values $V_{ac}$ in 240 V.

Subsequently, in Step S324, the conversion unit 52 calculates the current identification value $V_{ac}$. Specifically, the conversion unit 52 calculates the current identification value $V_{ac}$ by referring the power control table shown in FIG. 6 and converting the digital voltage value of the AC input voltage received by the reception unit 51 into the identification value of the matched AC power supply voltage. The conversion unit 52 stores the previously calculated identification value $V_{ac}$ (previous identification value $V_{ac}$) in the RAM 60 before the calculation of the current identification value $V_{ac}$.

Subsequently, in Step S326, the decision unit 153 confirms whether the value of a variable $C_i$ corresponding to the current identification value $V_{ac}$ is 0. Here, i is one of 1 to 4.

In Step S328, when the value of the variable $C_i$ is not 0 (No in Step S326), the decision unit 153 confirms whether the current identification value $V_{ac}$ agrees with the previous identification value $V_{ac}$.

In Step S330, when the value of the variable $C_i$ is 0 (Yes in Step S326) or when the current identification value $V_{ac}$ agrees with the previous identification value $V_{ac}$ (Yes in Step S328), the decision unit 153 increments the value of the variable $C_i$.

Subsequently, in Step S332, the decision unit 153 confirms whether the value of the variable $C_i$ is 5.

In Step S334, when the value of the variable $C_i$ is 5 (Yes in Step S332), the decision unit 153 decides the voltage indicated by the current identification value $V_{ac}$ as the AC power supply voltage.

When the value of the variable $C_i$ is not 5 (No in Step S332), the process returns to Step S324 and the conversion unit 52 calculates the current identification value $V_{ac}$.

In Step S336, when the current identification value $V_{ac}$ does not agree with the previous identification value $V_{ac}$ in Step S328 (No in Step S328), the decision unit 153 increments the value of the variable E.

Subsequently, in Step S338, the decision unit 153 confirms whether the value of the variable E is 5.

In Step S340, when the value of the variable E is 5 (Yes in Step S338), the decision unit 153 decides the voltage indicated by the identification value $V_{ae}$ of the voltage which yields the minimum current as the AC power supply voltage.

When the value of the variable E is not 5 (No in Step S338), the process returns to Step S324 and the conversion unit 52 calculates the current identification value $V_{ac}$.

According to the above-described processes, the voltage indicated by the identification value $V_{ac}$ is decided as the AC power supply voltage, when the identification values $V_{ac}$ of the AC power supply voltages calculated from the AC input voltages agree with each other four times (in the case in which the identification value $V_{ac}$ is calculated five times). When the disagreement number between the current and previous identification values $V_{ae}$ of the AC power supply voltages calculated from the AC input voltages reaches five, the voltage indicated by the identification value $V_{ae}$ of the voltage which yields the minimum current is decided as the AC power supply voltage.

For example, when the digital voltage values of the AC input voltages received by the reception unit 51 are 535, 543, 550, 557, 560, 555, and 557, the identification values $V_{ac}$ calculated by the conversion unit 52 become 220 V, 230 V, 230 V, 230 V, 230 V, 230 V, and 230 V, respectively. In this case, after the value of $C_2$ corresponding to 220 V is incremented, 220 V (535) disagrees with 230 V (543) as the comparison result. Thereafter, since the identification values $V_{ac}$ become 230 V continuously five times and thus agree with each other continuously four times, the value of the variable $C_3$ corresponding to 230 V reaches 5 and 230 V is decided as the AC power supply voltage. Thus, the fixing control of the fixing unit 80 is performed with the power (for example, 2400 W) of the default value.

In this second embodiment, even in a case where the AC input voltage is erroneously detected due to the noise intruded into the AC power supply, the voltage indicated by the identification value is not decided as the AC power supply voltage when the identification values of the AC power supply voltages calculated from the AC input voltages do not agree with each other continuously the predetermined number of times. Accordingly, in the second embodiment, it is possible to shorten the period necessary for deciding the AC power supply voltage, and it is possible to prevent the voltage from being erroneously decided as the AC power supply voltage, thereby appropriately performing the power control so that the consumption power does not increase or the fixing failure does not occur.

Modification of Second Embodiment

In the second embodiment, when the disagreement number between the current and previous identification values of the AC power supply voltages calculated from the AC input voltages reaches the predetermined number, the voltage may be decided as the AC power supply voltage of each country.

Figure 13:
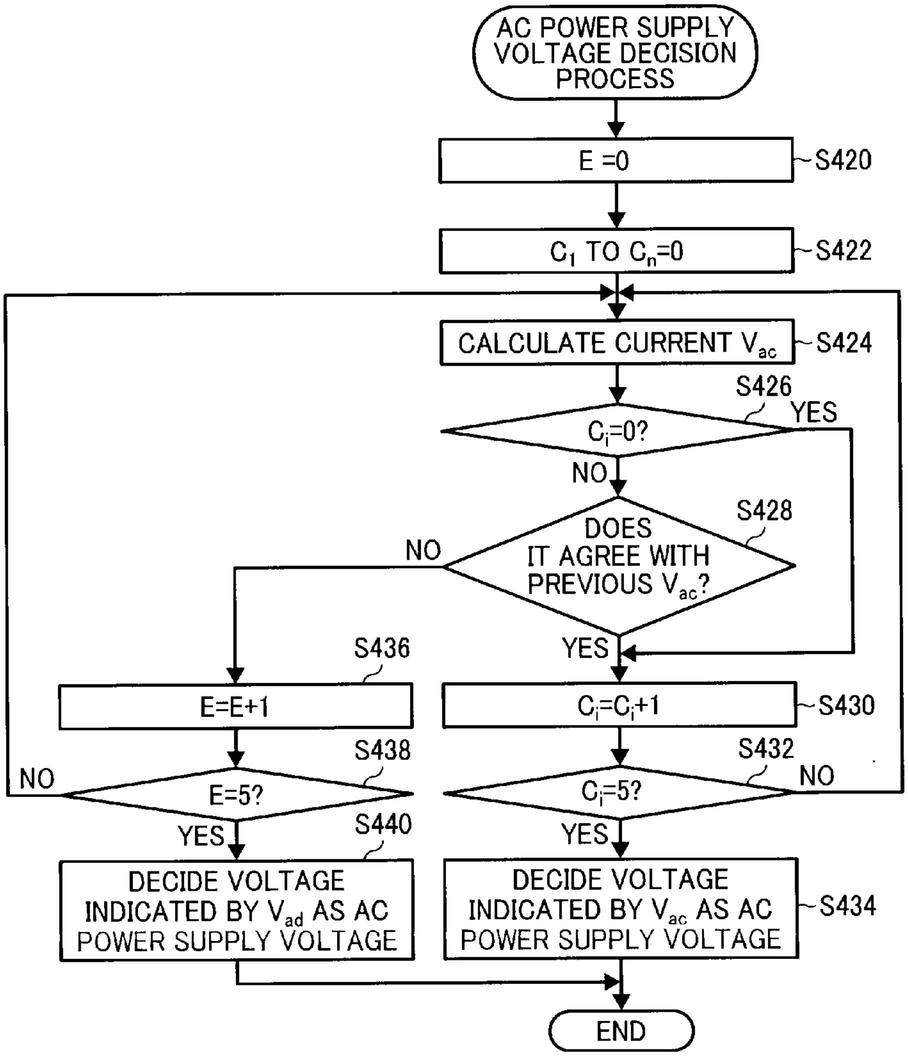
FIG. 13 is a flowchart illustrating an example of the AC power supply voltage decision process according to a modification of the second embodiment.

FIG. 13 is a flowchart illustrating an example of the sequence of the flow of the AC power supply voltage decision process according to a modification of the second embodiment.

Since the processes from Step S420 to Step S438 are the same as the processes from Step S320 to Step S338 of the flowchart shown in FIG. 12, the description will not be repeated.

In Step S440, when the value of the variable E is 5 (Yes in Step S438), the decision unit 153 decides the voltage indicated by the identification value $V_{ad}$ of the AC power supply voltage of each country as the AC power supply voltage.

Third Embodiment

In a third embodiment, a case will be described in which the fixing control of the fixing unit starts after decision of the AC power supply voltage will be described. Hereinafter, the difference between the third embodiment and the first embodiment will mainly be described. The same names and reference numerals as those of the first embodiment are given to the constituent elements having the same functions as those of the first embodiment, and the description thereof will not be repeated.

Figure 14:
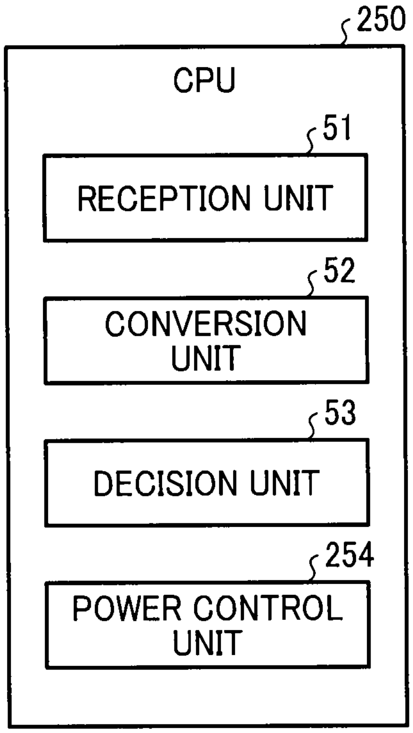
FIG. 14 is a block diagram illustrating an exemplary functional configuration of a CPU according to a third embodiment.

FIG. 14 is a block diagram illustrating an exemplary functional configuration of a CPU 250 according to a third embodiment. In the third embodiment, no acquisition unit is included and the processing details of a power control unit 254 are different from those of the first embodiment.

The power control unit 254 does not perform power control until a decision unit 53 decides a voltage.

Figure 15:
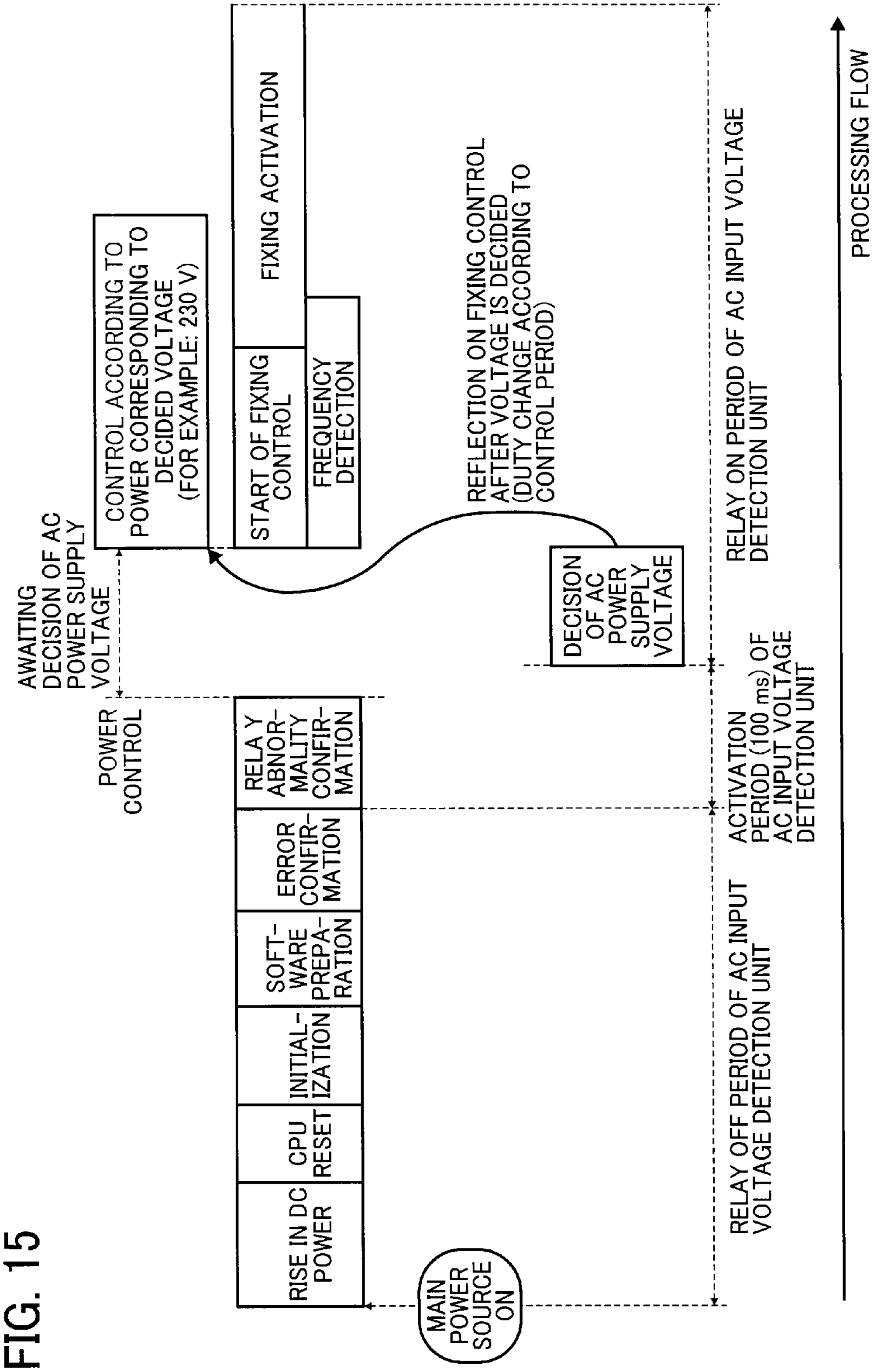
FIG. 15 is a diagram illustrating an example of a relationship between the state of an AC input voltage detection unit and the power control of a fixing unit after the start of the copying machine according to the third embodiment.

FIG. 15 is a diagram illustrating an example of a relationship between the state of an AC input voltage detection unit 20 and the power control of a fixing unit 80 after the start of a copying machine 1 according to the third embodiment.

In the third embodiment, as shown in FIG. 15, the fixing control of the fixing unit 80 is not performed immediately after the relay abnormality confirmation by the copying machine 1 ends as in the first embodiment, but the fixing control of the fixing unit 80 starts after the AC power supply voltage is decided.

Figure 16:
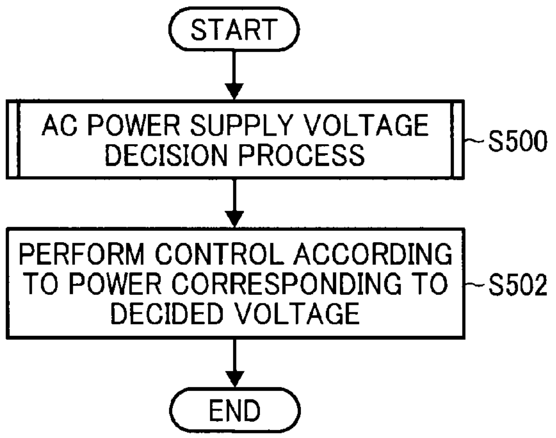
FIG. 16 is a flowchart illustrating an example of the power control performed by a power control apparatus according to the third embodiment.

FIG. 16 is a flowchart illustrating an example of the sequence of the flow of the power control according to the third embodiment.

First, in Step S500, a reception unit 51, a conversion unit 52, and a decision unit 53 perform an AC power supply voltage decision process, when a relay of the AC input voltage detection unit 20 is turned on. Since the AC power supply voltage decision process is the same as that of the first embodiment, the description thereof will not be repeated.

Subsequently, in Step S502, the power control unit 254 performs the fixing control of the fixing unit 80 with the power corresponding to the voltage decided in the AC power supply voltage decision process.

Fourth Embodiment

In a fourth embodiment, a case will be described in which it is determined whether an AC power supply voltage decision function is used. Hereinafter, the difference between the fourth embodiment and the first embodiment will mainly be described. The same names and reference numerals as those of the first embodiment are given to the constituent elements having the same functions as those of the first embodiment, and the description thereof will not be repeated.

Figure 17:
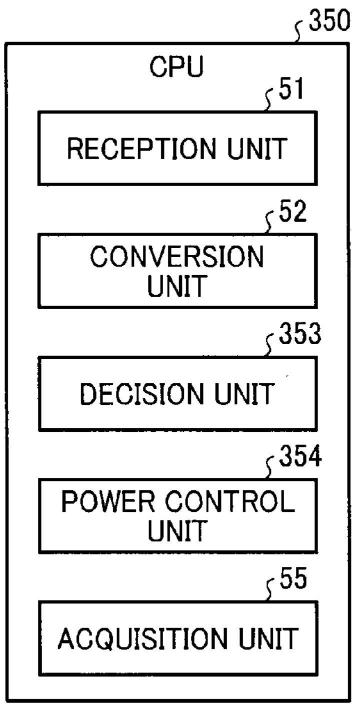
FIG. 17 is a block diagram illustrating an exemplary functional configuration of a CPU according to a fourth embodiment.

FIG. 17 is a block diagram illustrating an exemplary functional configuration of a CPU 350 according to the fourth embodiment. In the fourth embodiment, the processing details of a decision unit 353 and a power control unit 354 are different from those of the first embodiment.

Figure 18:
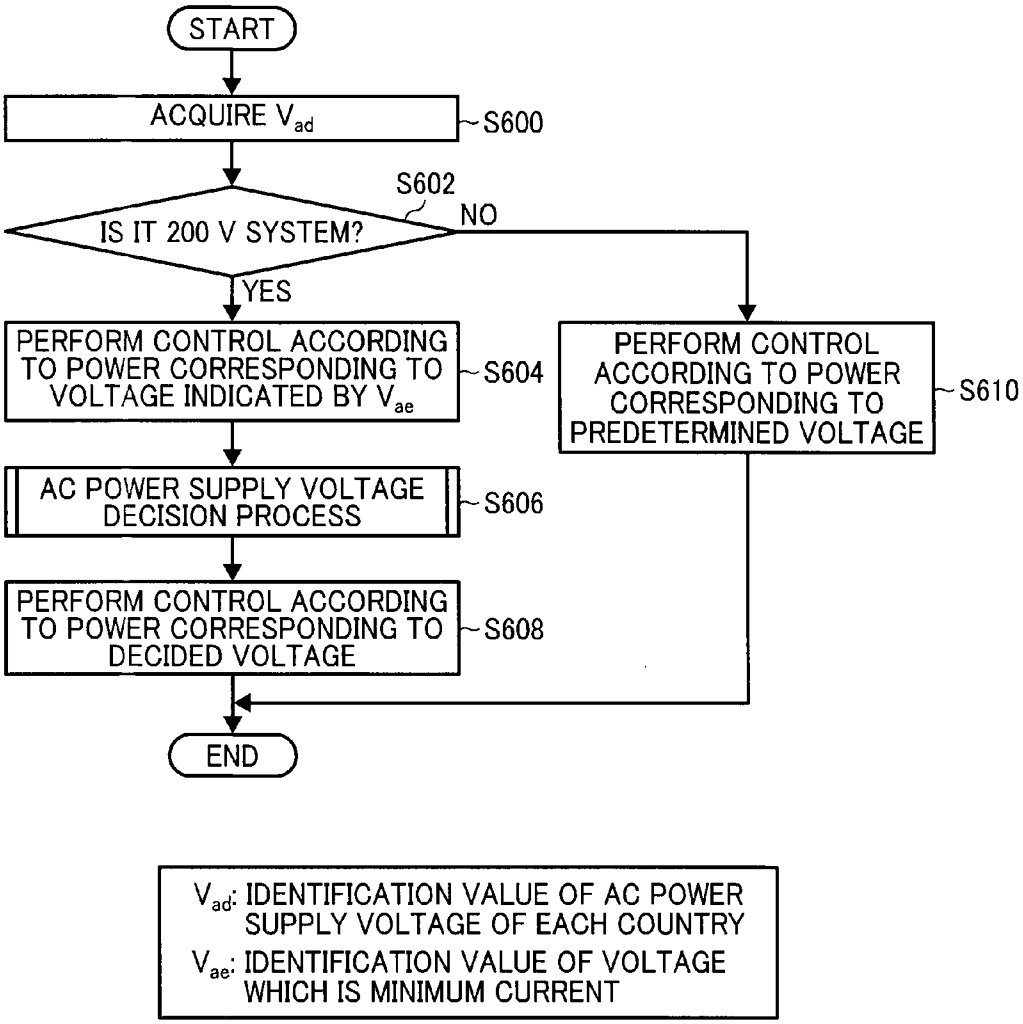
FIG. 18 is a flowchart illustrating an example of the power control performed by a power control apparatus according to the fourth embodiment.

FIG. 18 is a flowchart illustrating an example of the sequence of the flow of the power control according to the fourth embodiment.

First, in Step S600, an acquisition unit 55 acquires an identification value $V_{ad}$ of an AC power supply voltage of each country from ROM 70, when an AC input voltage detection unit 20 starts to be activated.

Subsequently, in Step S602, the decision unit 353 determines whether the AC power supply voltage is a 200 V system based on the identification value $V_{ad}$ acquired by the acquisition unit 55.

In Step S604, when the decision unit 353 determines that the AC power supply voltage is the 200 V system (Yes in Step S602), the power control unit 354 acquires the identification value $V_{ae}$ of the voltage which yields the minimum current from the ROM 70 and performs the fixing control of the fixing unit 80 with the power corresponding to the voltage indicated by the identification value $V_{ae}$.

Subsequently, in Step S606, a reception unit 51, a conversion unit 52, and a decision unit 353 perform the AC power supply voltage decision process, when the relay of the AC input voltage detection unit 20 is turned on. Since the AC power supply voltage decision process is the same as that of the first embodiment, the description thereof will not be repeated.

Subsequently, in Step S608, the power control unit 354 performs the fixing control of the fixing unit 80 with the power corresponding to the voltage decided in the AC power supply voltage decision process.

On the other hand, in Step S610, when the decision unit 353 determines that the AC power supply voltage is not the 200 V system in Step S602 (No in Step S602), the power control unit 354 performs the fixing control of the fixing unit 80 with the power according to a predetermined voltage (for example, voltage of a 100 V system).

In the fourth embodiment, the case in which the AC power supply voltage decision function is used only in the 200 V system has hitherto been described. However, the AC power supply voltage decision function may be used in the 100 V system, or the AC power supply voltage decision function may be used in both the 200 V system and the 100 V system.

Fifth Embodiment

In a fifth embodiment, a case will be described in which when the fixing control of a fixing unit 80 starts, the fixing control is performed with the power corresponding to the AC power supply voltage of each country and is performed with the power corresponding to the voltage decided after the AC power supply voltage is decided. Hereinafter, the difference between the fifth embodiment and the first embodiment will mainly be described. The same names and reference numerals as those of the first embodiment are given to the constituent elements having the same functions as those of the first embodiment, and the description thereof will not be repeated.

Figure 19:
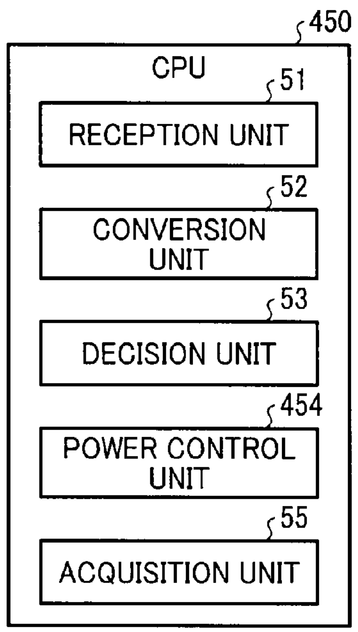
FIG. 19 is a block diagram illustrating an exemplary functional configuration of a CPU according to a fifth embodiment.

FIG. 19 is a block diagram illustrating an exemplary functional configuration of a CPU 450 according to the fifth embodiment. In the fifth embodiment, the processing details of a power control unit 454 are different from those of the first embodiment.

Figure 20:
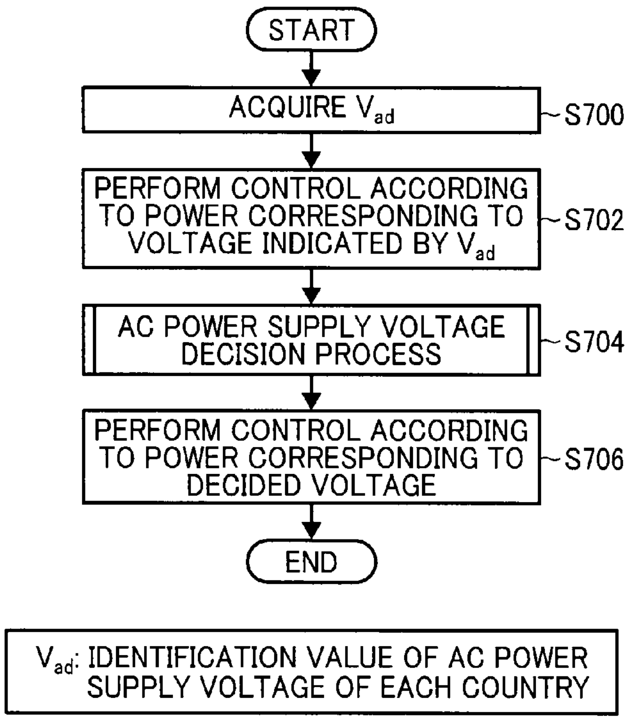
FIG. 20 is a flowchart illustrating an example of the power control performed by a power control apparatus according to the fifth embodiment.

FIG. 20 is a flowchart illustrating an example of the sequence of the flow of the power control according to the fifth embodiment.

First, in Step S700, an acquisition unit 55 acquires an identification value $V_{ad}$ of an AC power supply voltage of each country from ROM 70, when the activation of an AC input voltage detection unit 20 starts.

Subsequently, in Step S702, the power control unit 454 performs the fixing control of a fixing unit 80 with the power corresponding to a voltage indicated by the identification value $V_{ad}$ acquired by the acquisition unit 55.

Subsequently, in Step S704, a reception unit 51, a conversion unit 52, and a decision unit 53 perform an AC power supply voltage decision process, when a relay of the AC input voltage detection unit 20 is turned on. Since the AC power supply voltage decision process is the same as that of the first embodiment, the description thereof will not be repeated.

Subsequently, in Step S706, the power control unit 454 performs the fixing control of the fixing unit 80 with the power corresponding to the voltage decided in the AC power supply voltage decision process.

Sixth Embodiment

In a sixth embodiment, a case will be described in which the maximum value among voltages indicated by identification values in disagreement is decided as an AC power supply voltage, when a disagreement number between current and previous identification values of the AC power supply voltages calculated from AC input voltages reaches a predetermined number. Hereinafter, the difference between the sixth embodiment and the third embodiment will mainly be described. The same names and reference numerals as those of the third embodiment are given to the constituent elements having the same functions as those of the third embodiment, and the description thereof will not be repeated.

Figure 21:
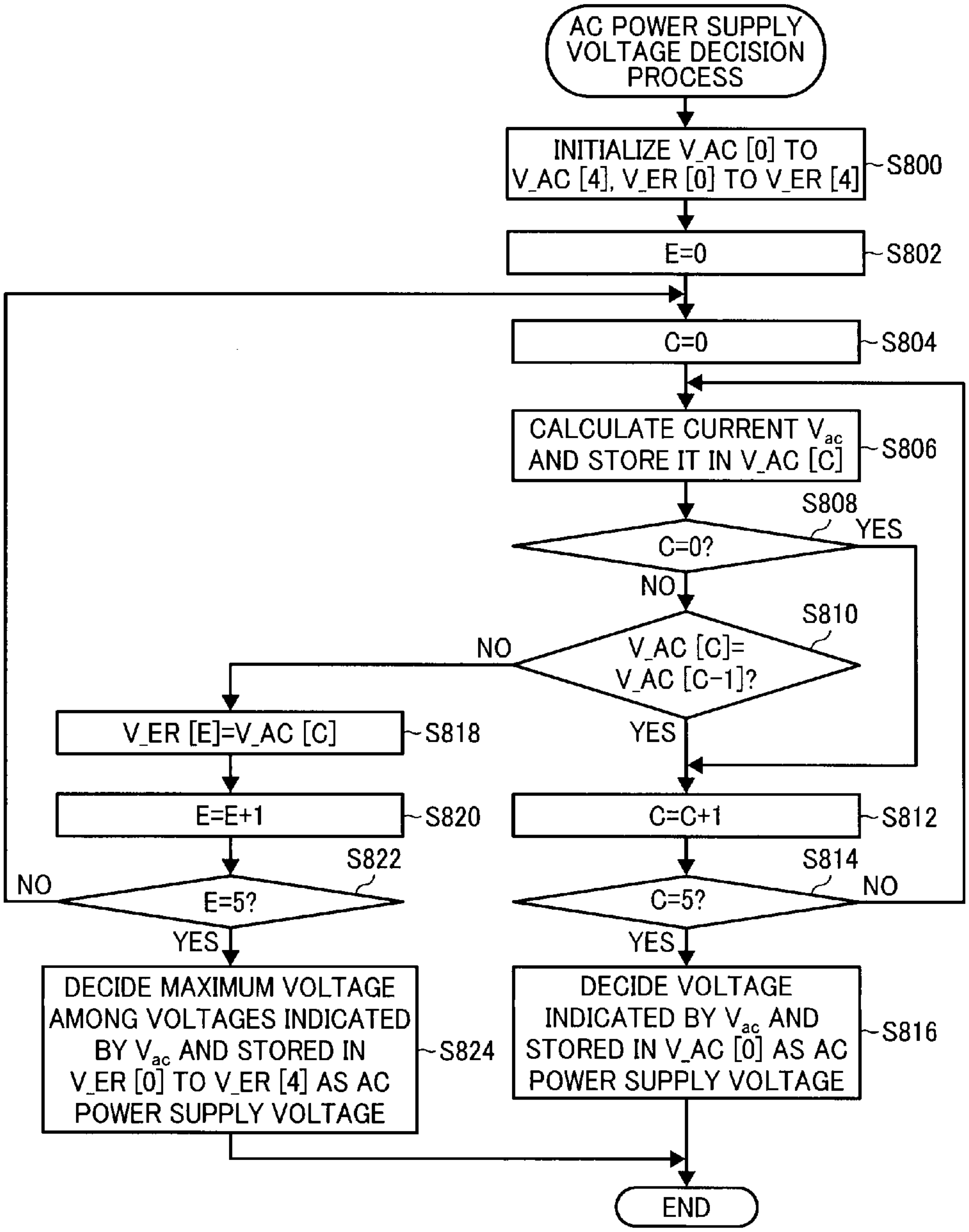
FIG. 21 is a flowchart illustrating an example of the AC power supply voltage decision process according to a sixth embodiment.

FIG. 21 is a flowchart illustrating an example of the sequence of the flow of an AC power supply voltage decision process according to the sixth embodiment.

First, in Step S800, a decision unit 53 initializes buffers V_AC [0] to V_AC [4] storing the identification values $V_{ac}$ of the AC power supply voltages calculated from the AC input voltages and buffers V_ER [0] to V_ER [4] storing the current identification values $V_{ac}$ when the current identification values $V_{ac}$ do not agree with the previous identification values $V_{ac}$.

Since the processes from Step S802 to Step S804 are the same as the processes from Step S120 to Step S122 of the flowchart shown in FIG. 9, the description thereof will not be repeated.

Subsequently, in Step S806, a conversion unit 52 calculates the current identification value $V_{ac}$ and stores the current identification value $V_{ac}$ in the buffer V_AC [C]. Specifically, the conversion unit 52 calculates the current identification value $V_{ac}$ by converting a digital voltage value of the AC input voltage received by the reception unit 51 into the identification value of the AC power supply voltage matched with reference to a power control table shown in FIG. 6.

Since the process of Step S808 is the same as the process of Step S126 of the flowchart shown in FIG. 9, the description thereof will not be repeated.

In Step S810, when the value of a variable C is not 0 in Step S808 (No in Step S808), the decision unit 53 confirms whether the current identification value $V_{ac}$ agrees with the previous identification value $V_{ac}$ by confirming whether the identification value $V_{ac}$ stored in the buffer V_AC [C] agrees with the identification value $V_{ac}$ stored in the buffer V_AC [C-1].

Since the processes from Step S812 to Step S814 are the same as the processes from Step S130 to Step S132 of the flowchart shown in FIG. 9, the description thereof will not be repeated.

In Step S816, when the value of the variable C is 5 in Step S814 (Yes in Step S814), the decision unit 53 decides the voltage indicated by the identification value $V_{ac}$ stored in the buffer V_AC [0] as the AC power supply voltage.

When the value of the variable C is not 5 (No in Step S814), the process returns to Step S806 and the conversion unit 52 calculates the current identification value $V_{ac}$.

In Step S818, when the current identification value $V_{ac}$ disagrees with the previous identification value $V_{ac}$ in Step S810 (No in Step S810), the decision unit 53 stores the identification value $V_{ac}$ stored in the buffer V_AC [C] in the buffer V_ER [E].

Since the processes from Step S820 to Step S822 are the same as the processes from Step S136 to Step S138 of the flowchart shown in FIG. 9, the description thereof will not be repeated.

In Step S824, when the value of a variable E is 5 in Step S822 (Yes in Step S822), the decision unit 53 decides the maximum voltage among the voltages indicated by the identification values $V_{ac}$ stored in the buffers V_ER [0] to V_ER [4] as the AC power supply voltage.

When the value of the variable E is not 5 in Step S822 (No in Step S822), the process returns to Step S804 and the decision unit 53 initializes the value of the variable C to 0.

According to the above-described processes, the voltage indicated by the identification value $V_{ac}$ is decided as the AC power supply voltage, when the identification values $V_{ac}$ of the AC power supply voltages calculated from the AC input voltages agree with each other continuously four times (when the identification value $V_{ac}$ is calculated continuously five times). When the disagreement number between the current and previous identification values $V_{ac}$ of the AC power supply voltages calculated from the AC input voltages reaches five, the maximum voltage among voltages indicated by the identification values $V_{ac}$ in the disagreement is decided as the AC power supply voltage.

For example, when the digital voltage values of the AC input voltages received by the reception unit 51 are 525, 545, 574, 544, 580, 544, 560, 577, 575, 590, and 566, the identification values $V_{ac}$ calculated by the conversion unit 52 are 220 V, 230 V, 240 V, 230 V, 240 V, 230 V, 230 V, 240 V, 240 V, 240 V, and 230 V. In this case, 220 V (525) and 230 V (545) disagree with each other as the comparison result and thus 230 V is stored in the buffer V_ER [0]. Subsequently, 240 V (574) and 230 V (544) disagree with each other as the comparison result and thus 240 V is stored in the buffer V_ER [1]. Subsequently, 240 V (580) and 230 V (544) disagree with each other as the comparison result and thus 240 V is stored in the buffer V_ER [2]. Subsequently, 230 V (560) and 240 V (577) disagree with each other as the comparison result and thus 240 V is stored in the buffer V_ER [3]. Subsequently, 240 V (590) and 230 V (566) disagree with each other as the comparison result and thus 240 V is stored in the buffer V_ER [4]. Here, since the disagreement number is 5, 240 V which is the maximum voltage among the voltages indicated by the identification values stored in the buffers V_ER [0] to V_ER [4] is decided as the AC power supply voltage. Thus, the fixing control of a fixing unit 80 is performed with the power (for example, 2200 W) of the default value −200 W. The fixing power can be used by the fixing control according to such a noise level.

In the sixth embodiment, the AC power supply voltage is detected immediately before the fixing control by the fixing unit 80 starts as in the third embodiment. Therefore, the AC power supply voltage can be stably detected without influence of inrush current or the like of the heater.

In the sixth embodiment, the AC power supply voltage is detected after the activation of the AC input voltage detection unit 20 is completed as in the third embodiment. Thus, it is possible to cope with a case in which the circuit of the AC input voltage detection unit 20 includes a filter and a waiting time is necessary until the circuit output of the AC input voltage detection unit 20 becomes stable after the AC power is input. When the AC input voltage detection unit 20 is disposed in the rear stage of an AC relay (not shown), a waiting time of the chattering time of the AC relay is necessary, but it is possible to also cope with the waiting time of the chattering time.

Modification of Sixth Embodiment

In the sixth embodiment, the AC power supply voltage may be detected at a predetermined timing, that is, not only immediately before the start of the fixing control by the fixing unit 80 but also in a real time. Accordingly, it is possible to cope with abnormal change in the AC power supply after the activation of the apparatus. When the AC power supply voltage is detected in a real time, a timing at which the AC power supply becomes unstable due to inrush current may occur. Therefore, the AC power supply voltage is detected in the other timings.

Figure 22:
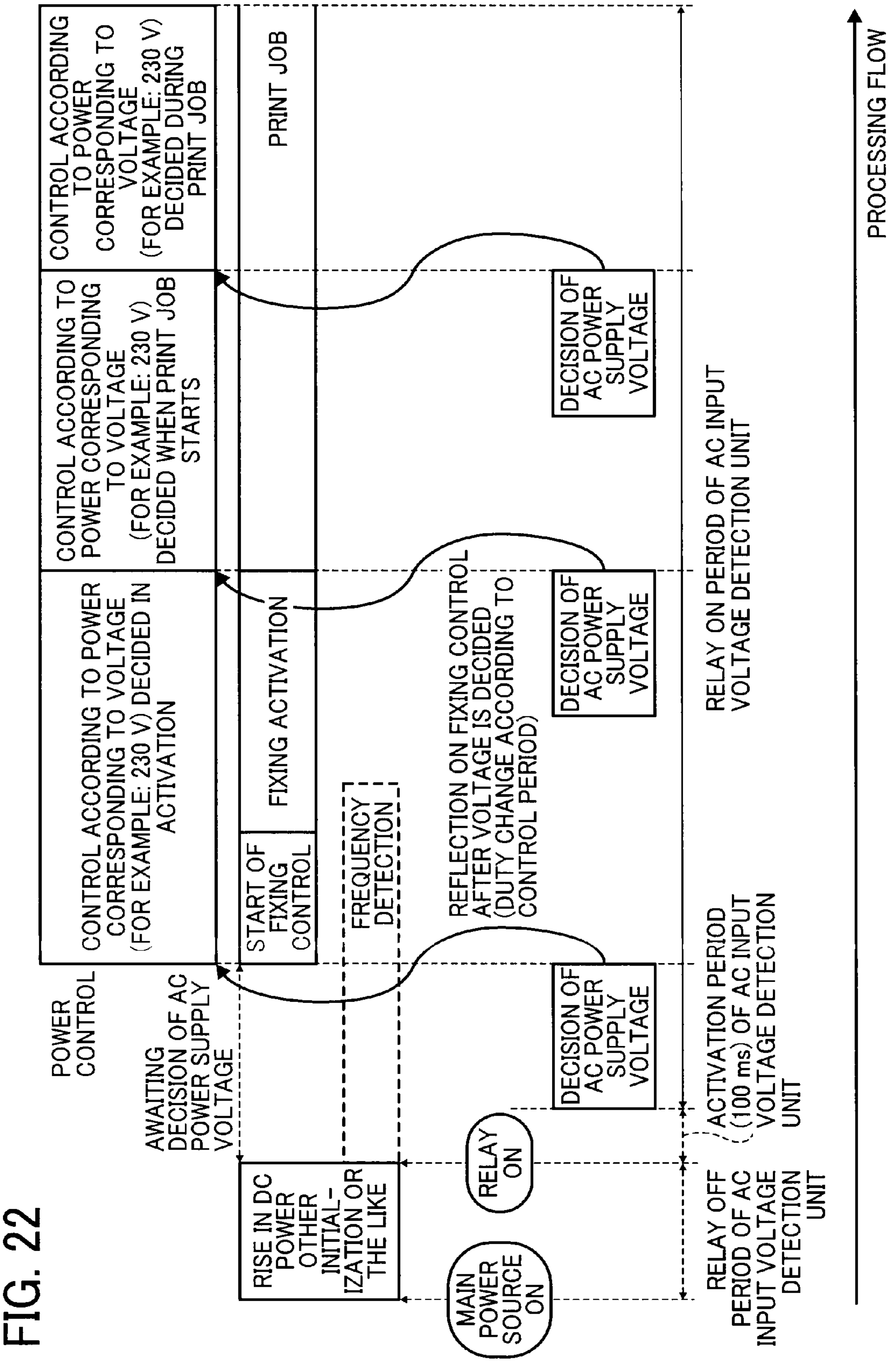
FIG. 22 is a diagram illustrating an example of detection timing of the AC power supply voltage according to a modified example of the sixth embodiment.

FIG. 22 is a diagram illustrating an example of detection timing of the AC power supply voltage according to the modification of the sixth embodiment. In the example shown in FIG. 22, the AC power supply voltage is detected not only immediately before the start of the fixing control by the fixing unit 80 but also immediately before start of a print job or during a print job. In this case, the AC power supply voltage used in the fixing control is used until the subsequent AC power supply voltage is decided.

Figure 23:
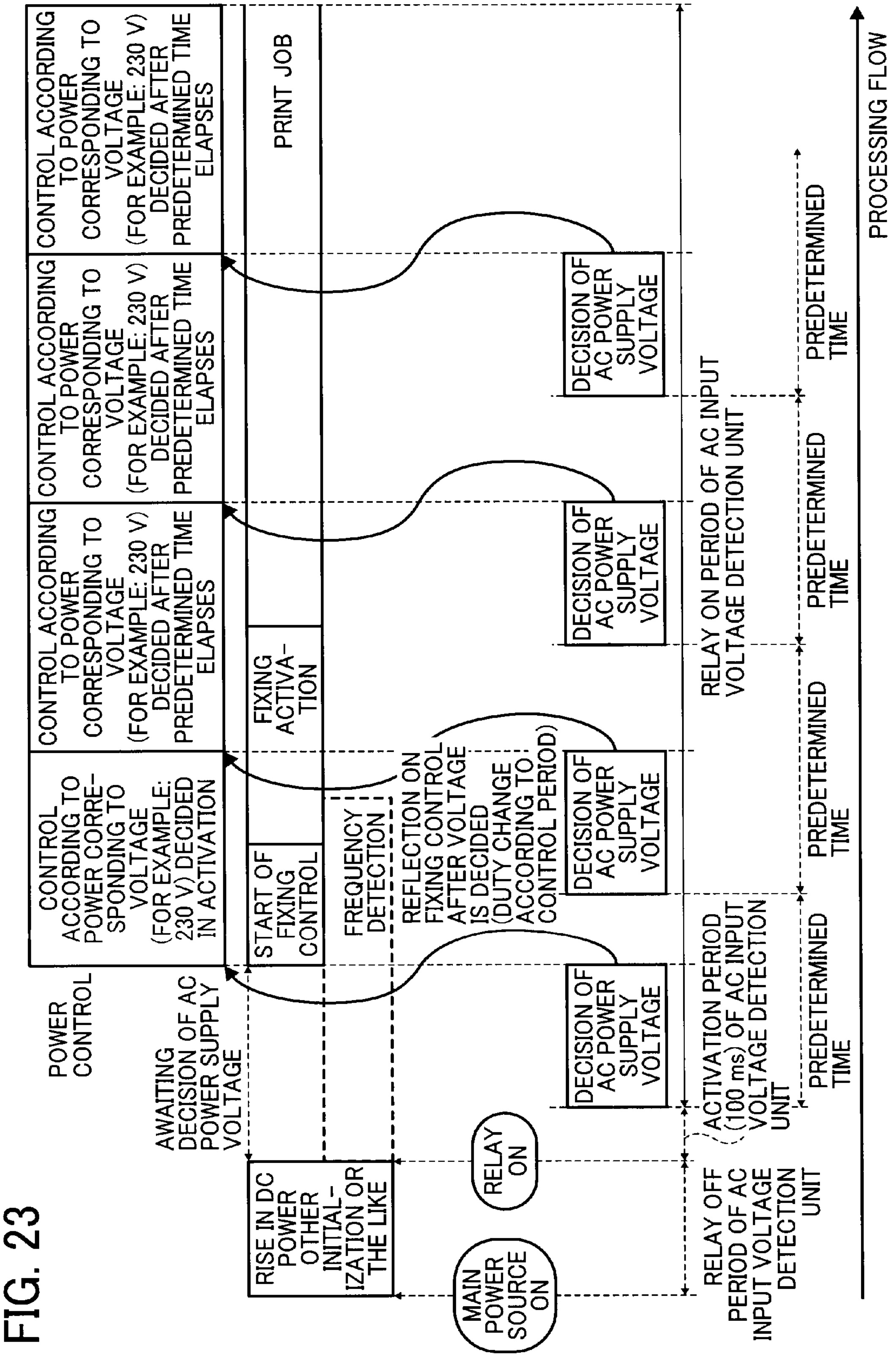
FIG. 23 is a diagram illustrating an example of detection timing of the AC power supply voltage according to a modified example of the sixth embodiment.

FIG. 23 is a diagram illustrating an example of detection timing of the AC power supply voltage according to the modified example of the sixth embodiment. In the example shown in FIG. 23, the AC power supply voltage is detected not only immediately before the start of the fixing control by the fixing unit 80 but also after the start of the fixing control and at an interval of a predetermined time. Even in this case, the AC power supply voltage used in the fixing control is used until the subsequent AC power supply voltage is decided.

Seventh Embodiment

In a seventh embodiment, a case in which an AC power supply voltage decision process is implemented by hardware will be described. Hereinafter, the difference between the seventh embodiment and the sixth embodiment (first embodiment) will mainly be described. The same names and reference numerals as those of the sixth embodiment are given to the constituent elements having the same functions as those of the sixth embodiment, and the description thereof will not be repeated.

Figure 24:
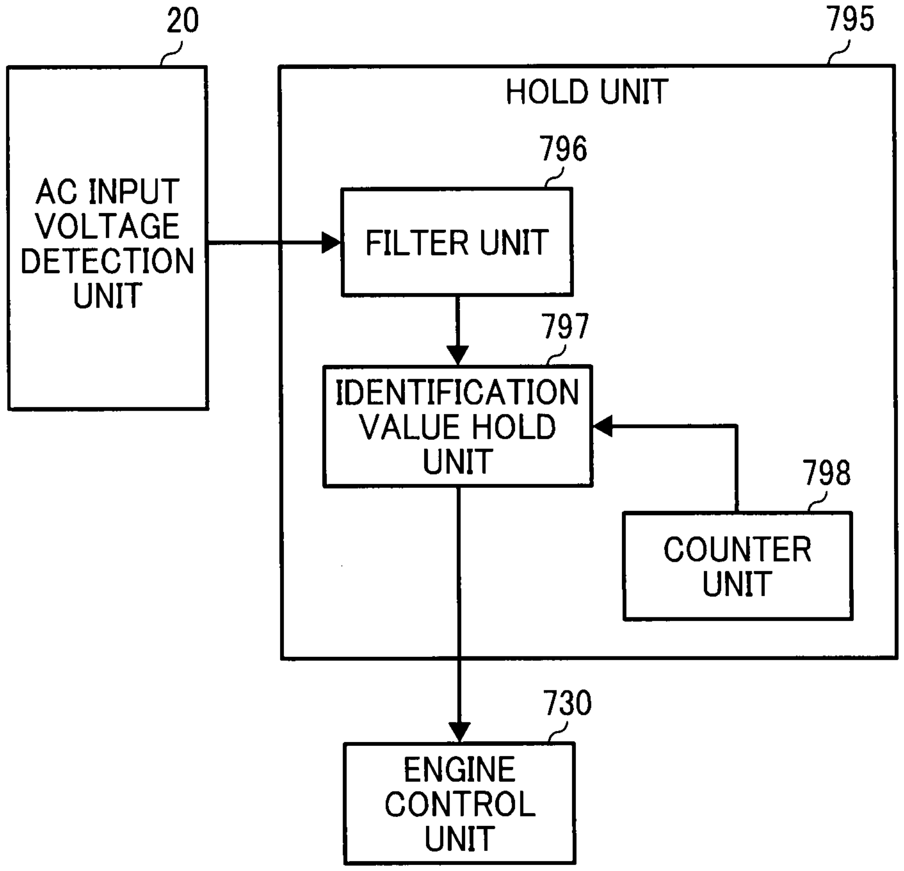
FIG. 24 is a block diagram illustrating an exemplary configuration of a part of the power control apparatus according to a seventh embodiment.

FIG. 24 is a block diagram illustrating an exemplary configuration of a part of a power control apparatus according to the seventh embodiment. The example shown in FIG. 24 is different from that of the sixth embodiment in that the control details of an engine control unit 730 and a hold unit 795 are added.

The hold unit 795 includes a filter unit 796, an identification value hold unit 797, and a counter unit 798.

The filter unit 796 is a circuit that executes the above-described AC power supply voltage decision process. The identification value hold unit 797 is a circuit that holds the identification value of the AC power supply voltage decided by the filter unit 796. The identification value hold unit 797 outputs the identification value of the AC power supply voltage based on an instruction of the counter unit 798. The counter unit 798 counts a predetermined time and instructs the identification value hold unit 797 to output the identification value of the AC power supply voltage when the counting ends. When the above-described AC power supply voltage decision process is executed as well as when an AC input voltage detection unit 20 is activated, the counting of the counter unit 798 is again started after the counting ends. Accordingly, the identification value of the AC power supply voltage is output from the identification value hold unit 797 at each predetermined time.

The engine control unit 730 performs the fixing control of the fixing unit 80 using the identification value of the AC power supply voltage output from the hold unit 795. The engine control unit 730 may calculate the average of the identification values of the AC power supply voltages output from the hold unit 795 and may perform the fixing control of the fixing unit 80 using the calculated average.

According to the seventh embodiment, since the hold unit 795 configured as hardware decides the AC power supply voltage, the control of the engine control unit 730 which is executed by software can be simplified.

Although illustration is omitted, a relay is mounted between an AC power supply 5 and an AC input voltage detection unit 20 (in the front stage of the AC input voltage detection unit 20) in order to save the energy, but the invention is not limited thereto. Instead, the relay may be mounted in the rear stage of the AC input voltage detection unit 20. Thus, the AC power supply voltage decision process can be performed without awaiting the activation of the AC input voltage detection unit 20.

Modifications

The invention is not limited to the above-described embodiments, but may be modified in various forms. For example, in the above-described embodiments, the case in which the power control apparatus is applied to the copying machine has hitherto been described. However, the power control apparatus is applicable to a printer, a facsimile apparatus, a multi-function apparatus, and the like. Moreover, the invention is not limited to the image forming apparatus, but the power control apparatus is applicable to an electronic apparatus performing control according to AC power. Furthermore, the above-described embodiments may be appropriately combined.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power control apparatus comprising a central processing unit (CPU) configured to:

sequentially receive inputs of voltage values corresponding to AC input voltages from AC power supplies;

store a power control table that includes a plurality of groups, each of the groups having voltage values forming a range such that the voltage values in one group indicate a same AC power supply voltage, and each of the groups being matched with a power control parameter corresponding to the same AC power supply voltage;

determine to which group the received voltage values belong among the plurality of groups, whenever an input of a voltage value is received, and decide the group, to which a predetermined number of voltage values belongs among the plurality of voltage values sequentially received, among the plurality of groups; and control a power supply according to the power control parameter matched with the decided group.

2. The power control apparatus according to claim 1, wherein:

in the power control table, an identification value of the AC power supply voltage is further matched with a group, and the CPU is further configured to:

convert the received voltage value into the matched identification value, whenever the input of the voltage value is received, determine whether a current identification value agrees with a previous identification value whenever a conversion is performed, and decide the identification value when agreements are continuously produced by a predetermined number, and control the power supply according to the power control parameter matched with the decided identification value.

3. The power control apparatus according to claim 1, wherein:

in the power control table, an identification value of the AC power supply voltage is further matched with each group, and the CPU is further configured to:

convert the received voltage value into the matched identification value, whenever the input of the voltage value is received, determine whether a current identification value agrees with a previous identification value whenever a conversion is performed, and decide the identification value when a number of agreements reaches a predetermined number, and control the power supply according to the power control parameter matched with the decided identification value.

4. The power control apparatus according to claim 2, wherein the CPU is configured to decide the identification value indicating a predetermined voltage, when a number of disagreements reaches a predetermined number.

5. The power control apparatus according to claim 4, wherein the identification value indicating the predetermined voltage represents a voltage which yields a minimum current.

6. The power control apparatus according to claim 4, wherein the identification value indicating the predetermined voltage represents an AC power supply voltage of a destination region.

7. The power control apparatus according to claim 2, wherein when a number of disagreements reaches a predetermined number, the CPU is configured to decide an identification value indicating a maximum voltage among the current identification values in the disagreement.

8. The power control apparatus according to claim 1, wherein the CPU is configured to control the power supply according to a predetermined voltage, until the identification value is decided.

9. The power control apparatus according to claim 8, wherein the predetermined voltage is the voltage which yields the minimum current.

10. The power control apparatus according to claim 8, wherein the predetermined voltage is the AC power supply voltage corresponding to a destination region.

11. The power control apparatus according to claim 1, wherein the CPU is configured to decide the group containing the predetermined number of voltage values at each predetermined timing.

12. The power control apparatus according to claim 1, wherein the CPU is configured to determine whether to perform a process of deciding the identification value according to the AC power supply voltage corresponding to a destination region.

13. An image forming apparatus comprising:

a power control apparatus including a central processing unit (CPU) configured to:

sequentially receive an input of voltage values indicating AC input voltages from AC power supplies;

store a power control table that includes a plurality of groups, each of the groups having voltage values forming a range such that the voltage values in one group indicate a same AC power supply voltage, and each of the groups being matched with a power control parameter corresponding to the same AC power supply voltage;

determine to which group the received voltage values belong among the plurality of groups, whenever an input of a voltage value is received, and decide the group, to which a predetermined number of voltage values belongs among the plurality of voltage values sequentially received, among the plurality of groups; and control a power supply according to the power control parameter matched with the decided group.

14. A non-transitory computer-readable medium having computer readable program codes embodied in the medium that when executed causes a computer to execute the steps of:

sequentially receiving an input of voltage values indicating an AC input voltage from an AC power supply;

determining that to which group the received voltage values belong among the plurality of groups, whenever the input of the voltage values is received, with reference to a power control table that includes a plurality of groups, each of the groups having voltage values forming a range such that the voltage values in one group indicate a same AC power supply voltage, and each of the groups being matched with a power control parameter corresponding to the same AC power supply voltage, and deciding the group, to which a predetermined number of voltage values belongs among the plurality of voltage values sequentially received, among the plurality of groups; and controlling a power supply according to the power control parameter matched with the decided group.

15. The power control apparatus according to claim 3, wherein the CPU is configured to decide the identification value indicating a predetermined voltage, when a number of disagreements reaches a predetermined number.

16. The power control apparatus according to claim 15, wherein the identification value indicating the predetermined voltage represents a voltage which yields a minimum current.

17. The power control apparatus according to claim 15, wherein the identification value indicating the predetermined voltage represents an AC power supply voltage of a destination region.

18. The power control apparatus according to claim 3, wherein when a number of disagreements reaches a predetermined number, the CPU is configured to decide an identification value indicating a maximum voltage among the current identification values in the disagreement.

* * * * *